United States Patent
Yang et al.

(10) Patent No.: US 12,366,956 B2
(45) Date of Patent: *Jul. 22, 2025

(54) VIRTUAL OBJECT CONTROL METHOD AND APPARATUS, DEVICE, STORAGE MEDIUM, AND COMPUTER PROGRAM PRODUCT

(71) Applicant: Tencent Technology (Shenzhen) Company Limited, Shenzhen (CN)

(72) Inventors: Zefeng Yang, Shenzhen (CN); Jiaqi Pan, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,116

(22) Filed: Sep. 26, 2023

(65) Prior Publication Data
US 2024/0028193 A1  Jan. 25, 2024

Related U.S. Application Data

(63) Continuation of application No. 17/548,183, filed on Dec. 10, 2021, now Pat. No. 11,803,301, which is a
(Continued)

(30) Foreign Application Priority Data

Nov. 19, 2020  (CN) .......................... 202011302236.2

(51) Int. Cl.
*G06F 3/04886* (2022.01)
*A63F 13/56* (2014.01)
(Continued)

(52) U.S. Cl.
CPC ........ *G06F 3/04886* (2013.01); *G06F 3/0481* (2013.01); *G06F 3/04845* (2013.01); *A63F 13/56* (2014.09); *A63F 13/58* (2014.09)

(58) Field of Classification Search
CPC ............... G06F 3/04886; G06F 3/0481; G06F 3/04845; G06F 3/04883; G06F 3/0488;
(Continued)

(56) References Cited

U.S. PATENT DOCUMENTS 9,901,824 B2 *  2/2018  Borodovsky ......... A63F 13/537
10,039,980 B2 *  8/2018  Matsui .................... A63F 13/42
(Continued)

FOREIGN PATENT DOCUMENTS

CN  108245887 A    7/2018
CN  108379844 A *  8/2018  ......... A63F 13/2145
(Continued)

OTHER PUBLICATIONS

Office Action issued on Korean application 10-2021-7035427 on Oct. 17, 2023, with translation, 14 pages.
(Continued)

*Primary Examiner* — Ting Z Lee
(74) *Attorney, Agent, or Firm* — Crowell & Moring LLP

(57) ABSTRACT

A virtual object control method includes: displaying, in response to a virtual object in a virtual scene being in a first movement state, at least two switch controls including a target switch control in an interface of the virtual scene, and a switching control other than the target switch control, the switching control being a control copy of the target switch control, and a display position of the control copy being different from a display position of the target switch control; and controlling, in response to a state switching operation triggered based on the control copy, the virtual object to be switched from the first movement state to a second movement state.

20 Claims, 15 Drawing Sheets

Related U.S. Application Data continuation of application No. PCT/CN2021/115804, filed on Aug. 31, 2021.

(51) Int. Cl.
*A63F 13/58* (2014.01)
*G06F 3/0481* (2022.01)
*G06F 3/04845* (2022.01)

(58) Field of Classification Search
CPC ...... G06F 3/048; G06F 3/04817; A63F 13/52; A63F 13/53; A63F 13/56; A63F 13/57; A63F 13/58
See application file for complete search history.

(56) References Cited

U.S. PATENT DOCUMENTS

| | | | |
|---|---|---|---|
| 11,071,906 B2* | 7/2021 | Hemby | G06F 3/04815 |
| 2008/0074389 A1* | 3/2008 | Beale | G06F 3/013 345/157 |
| 2011/0172013 A1 | 7/2011 | Shirasaka | |
| 2018/0373376 A1* | 12/2018 | Kurabayashi | A63F 13/218 |
| 2020/0282308 A1 | 9/2020 | Guo et al. | |
| 2020/0298104 A1 | 9/2020 | Wang | |
| 2020/0298121 A1 | 9/2020 | Deng | |
| 2021/0303129 A1* | 9/2021 | Li | G06F 3/04815 |

FOREIGN PATENT DOCUMENTS

| | | | | |
|---|---|---|---|---|
| CN | 108509139 A | | 9/2018 | |
| CN | 110124314 A | | 8/2019 | |
| CN | 110270086 A | * | 9/2019 | ......... A63F 13/2145 |
| CN | 111097166 A | | 5/2020 | |
| CN | 111399639 A | | 7/2020 | |
| CN | 112402959 A | | 2/2021 | |
| KR | 10-2020-0091897 A | | 7/2020 | |
| WO | WO 2019/153837 A1 | | 8/2019 | |

OTHER PUBLICATIONS

International Search Report and Written Opinion for PCT/CN2021/115804 mailed Nov. 26, 2021 (11 pages).
Chinese Office Action for Chinese Application No. 202011302236.2 dated Dec. 30, 2021, including an English translation (24 pages).
https://www.bilibili.com/video/BV1ZW411C7Xm?from=search&seid=1922737123068949; Sep. 13, 2018, including an English Concise Explanation of Relevance (4 pages).
International Search Report and Written Opinion for International Application No. PCT/CN2021/115804 mailed Nov. 26, 2021 including English translation of International Search Report (13 pages).
Office Action issued on Japanese Application 2021-565094 dated Mar. 13, 2023, 4 pages.
Office Action issued on Singapore Application 11202111566R dated Apr. 17, 2023, 10 pages.
Wilderness Action Start Guide with English Abstract, "Let's thin the layout of your choice with lse layout" Mar. 2, 2023 (4 pages).

* cited by examiner

VIRTUAL OBJECT CONTROL METHOD AND APPARATUS, DEVICE, STORAGE MEDIUM, AND COMPUTER PROGRAM PRODUCT

RELATED APPLICATION

This application is a continuation of U.S. Non-Provisional application Ser. No. 17/548,183, filed Dec. 10, 2021, which is a continuation of International Patent Application No. PCT/CN2021/115804, filed Aug. 31, 2021, which claims priority to Chinese Patent Application No. 202011302236.2, filed Nov. 19, 2020. The contents of U.S. Non-Provisional application Ser. No. 17/548,183, International Patent Application No. PCT/CN2021/115804, and Chinese Patent Application No. 202011302236.2 are incorporated herein by reference in their entirety.

FIELD OF THE TECHNOLOGY

This application relates to the field of computer technologies, and in particular, to a virtual object control method and apparatus, a device, a computer-readable storage medium, and a computer program product.

BACKGROUND OF THE DISCLOSURE

Display technologies based on graphics processing hardware extend channels for perceiving an environment and obtaining information, especially the display technologies of virtual scenes having various typical application scenarios, can realize, according to actual application requirements, diversified interactions between virtual objects controlled by users or artificial intelligence (AI), and can simulate a real battle process between the virtual objects in the virtual scenes such as military exercise simulation and a game.

In the related art, the user may control, by using a terminal, a virtual object in a virtual scene to perform activities, for example, control a virtual object to move in a virtual scene, and switch a movement state of the virtual object. When there is a need to control the virtual object to perform movement state switching, the user needs to trigger a state switching control. However, a display position of the state switching control cannot adapt to operating habits of each user, resulting in low human-computer interaction efficiency.

SUMMARY

Embodiments of this application provide a virtual object control method and apparatus, and a computer-readable storage medium, which can realize switching between movement states by using a control copy and improve human-computer interaction efficiency.

The technical solutions in the embodiments of this application are implemented as follows:

The embodiments of this application provide a virtual object control method, performed by a computer device, the method including:

displaying, in response to a virtual object in a virtual scene being in a first movement state, at least two switch controls including a target switch control in an interface of the virtual scene, and a switching control other than the target switch control, the switching control being a control copy of the target switch control, and a display position of the control copy being different from a display position of the target switch control; and controlling, in response to a state switching operation triggered based on the control copy, the virtual object to be switched from the first movement state to a second movement state.

The embodiments of this application provide a virtual object control apparatus, including:

a display module, configured to display, in response to a virtual object in a virtual scene being in a first movement state, at least two switch controls including a target switch control in an interface of the virtual scene, and a switching control other than the target switch control, the switching control being a control copy of the target switch control, and a display position of the control copy being different from a display position of the target switch control; and a switching module, configured to control, in response to a state switching operation triggered based on the control copy, the virtual object to be switched from the first movement state to a second movement state.

The embodiments of this application provide a computer device, including:

a memory, configured to store executable instructions; and a processor, configured to implement, when executing the executable instructions stored in the memory, the virtual object control method provided in the embodiments of this application.

The embodiments of this application provide a non-transitory computer-readable storage medium, storing executable instructions, the executable instructions, when executed by a processor, implementing the virtual object control method provided in the embodiments of this application.

The embodiments of this application provide a computer program product, including a computer program or instructions, the computer program or the instructions, when executed by a processor, implementing the virtual object control method provided in the embodiments of this application.

The embodiments of this application have the following beneficial effects:

With the application of the embodiments of this application, when a virtual object in a virtual scene is in a first movement state, at least two switch controls including a target switch control are displayed in an interface of the virtual scene, where a switching control other than the target switch control in the at least two switch controls is a control copy of the target switch control, and a display position of the control copy is different from a display position of the target switch control. In response to a state switching operation triggered based on the control copy, the virtual object is controlled to be switched from the first movement state to a second movement state. In this way, when the display position of the target switch control does not conform to operating habits of a user, the control copy may be selected from the at least two switch controls, to realize switching between the movement states, thereby improving the human-computer interaction efficiency.

DESCRIPTION OF EMBODIMENTS

Figure 1:
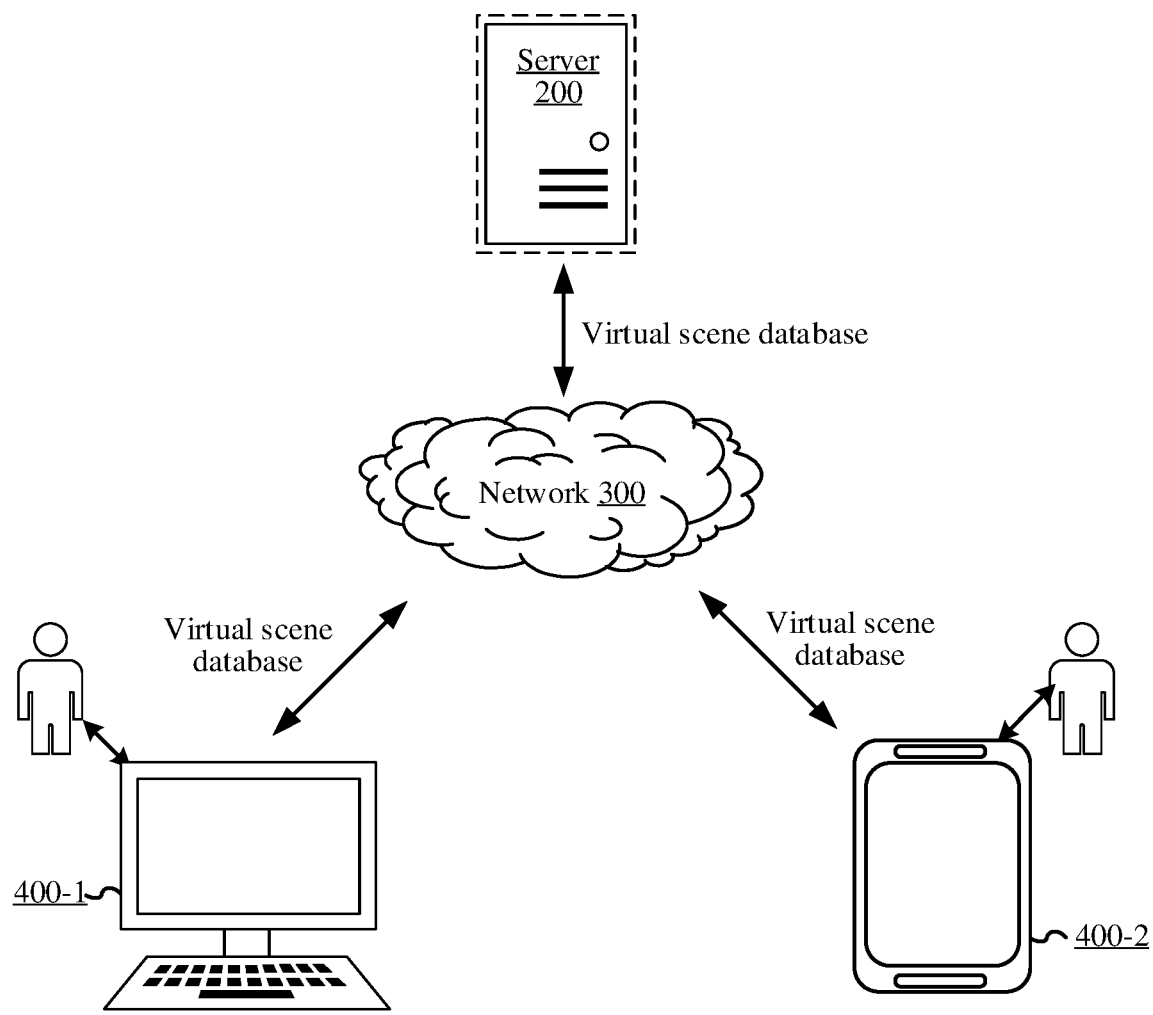
FIG. 1 is a schematic diagram of an implementation scenario of a virtual object control method according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

(1) A client, such as a video playback client and a game client, is an application (APP) running on a terminal for providing various services.

(2). The expression "in response to" is used for indicating a condition or a status on which a to-be-performed operation depends. When the condition or the status is satisfied, one or more to-be-performed operations may be real-time or have a set delay. Unless otherwise specified, there is no chronological order between the plurality of to-be-performed operations.

(3) A virtual scene is a virtual scene displayed (or provided) when an APP runs on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this application. For example, the virtual scene may include the sky, the land, the ocean, or the like. The land may include environmental elements such as the desert and a city. The user may control the virtual object to move in the virtual scene.

(4) Virtual objects are images of various people and things that can interact in a virtual scene, or are movable objects in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

Optionally, the controlled virtual object may be a player character controlled through an operation on a client, or may be an AI character set in a virtual scene battle through training, or may be a non-player character (NPC) set in virtual scene interaction. Optionally, the virtual object may be a virtual character for competition in a virtual scene. Optionally, a quantity of virtual objects participating in the interaction in the virtual scene may be preset, or may be dynamically determined according to a quantity of clients participating in the interaction.

(5) Scene data represents various features represented by objects during interaction in a virtual scene. For example, the scene data may include a position of an object in a virtual scene. Certainly, different types of features may be included according to different types of virtual scenes. For example, in a virtual scene of a game, scene data may include a waiting time (which depends on a quantity of times the same function can be used in a specific time) needed during configuration of various functions in the virtual scene, or may represent attribute values such as health points (also referred to as red points) and magic points (also referred to as blue points) of various states of a game character.

FIG. 1 is a schematic diagram of an implementation scenario of a virtual object control method according to an embodiment of this application. To support an exemplary application, a terminal (where a terminal 400-1 and a terminal 400-2 are shown as an example) is connected to a server 200 by using a network 300. The network 300 may be a wide area network, a local area network, or a combination of thereof. Data transmission is implemented by using a radio link.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this embodiment of this application.

During actual implementation, an APP supporting a virtual scene is installed and run on the terminal (for example, the terminal 400-1). The APP may be any one of a first-person shooter (FPS) game, a third-person shooter game, a multiplayer online battle arena (MOBA) game, a virtual reality APP, a three-dimensional map program, a military simulation program, or a multiplayer gunfight survival game. A user uses the terminal to operate a virtual object located in a virtual scene to perform activities. The activities include, but are not limited to: at least one of adjusting body postures, crawling, walking, running, riding, jumping, driving, picking, shooting, attacking, and throwing. For example, the virtual object is a virtual character such as a simulated character role or a cartoon character role.

In an exemplary embodiment, a first virtual object controlled by the terminal 400-1 and a second virtual object controlled by the terminal 400-2 are located in the same virtual scene, and in this case, the first virtual object may interact with the second virtual object in the virtual scene. In some embodiments, the first virtual object and the second virtual object may be in an alliance relationship, for example, the first virtual object and the second virtual object belong to the same team and organization. In the virtual scene, there is also a virtual object that is in a hostile relationship with the first virtual object. The virtual objects in the hostile relationship may interact with each other in an adversarial manner by shooting each other on the land.

In an exemplary embodiment, the terminal 400-1 controls the virtual object to move in the virtual scene, and displays, on the terminal, a picture of the virtual scene obtained by observing the virtual scene from a movement perspective of the virtual object. When the virtual object in the virtual scene is in the first movement state (for example, in a sprinting state), at least two switch controls including a target switch control and a switching control other than the target switch control are displayed in an interface of the virtual scene. The switching control other than the target switch control is a control copy of the target switch control, and a display position of the control copy is different from a display position of the target switch control. In response to a state switching operation triggered based on the control copy, the virtual object is controlled to be switched from the first movement state to a second movement state (for example, switched from the sprinting state to a sliding state). The picture of the virtual scene includes an object interaction environment, an interactive object, and the like. The picture of the virtual scene is obtained based on virtual scene data.

In an exemplary embodiment, in a military virtual simulation application, a virtual scene technology is used for enabling trainees to visually and auditorily experience a battlefield environment, familiarize the trainees with environmental features of a combat region, and interact with objects in a virtual environment by using necessary devices. A virtual battlefield environment can be realized by using a corresponding three-dimensional battlefield environment graphic image library, including a combat background, a battlefield scene, various weapons and equipment and combat personnel, and the like. Through background generation and image synthesis, a dangerous and almost real three-dimensional battlefield environment is created.

During actual implementation, the terminal 400-1 displays a picture of a virtual scene obtained by observing a virtual scene (for example, a city A) by virtual objects (for example, simulated combat personnel). When the virtual object in the virtual scene is in the first movement state (for example, in the sprinting state), the interface of the virtual scene displays the at least two switch controls including the target switch control, where the switching control other than the target switch control in the at least two switch controls is the control copy of the target switch control, and the display position of the control copy is different from the display position of the target switch control, for example, the target switch control is displayed on the right side of the interface of the virtual scene, and the control copy of the target switch control is displayed on the left side of the interface of the virtual scene. In response to the state switching operation triggered based on the control copy, the virtual object is controlled to be switched from the first movement state to the second movement state (for example, switched from the sprinting state to the sliding state).

Figure 2:
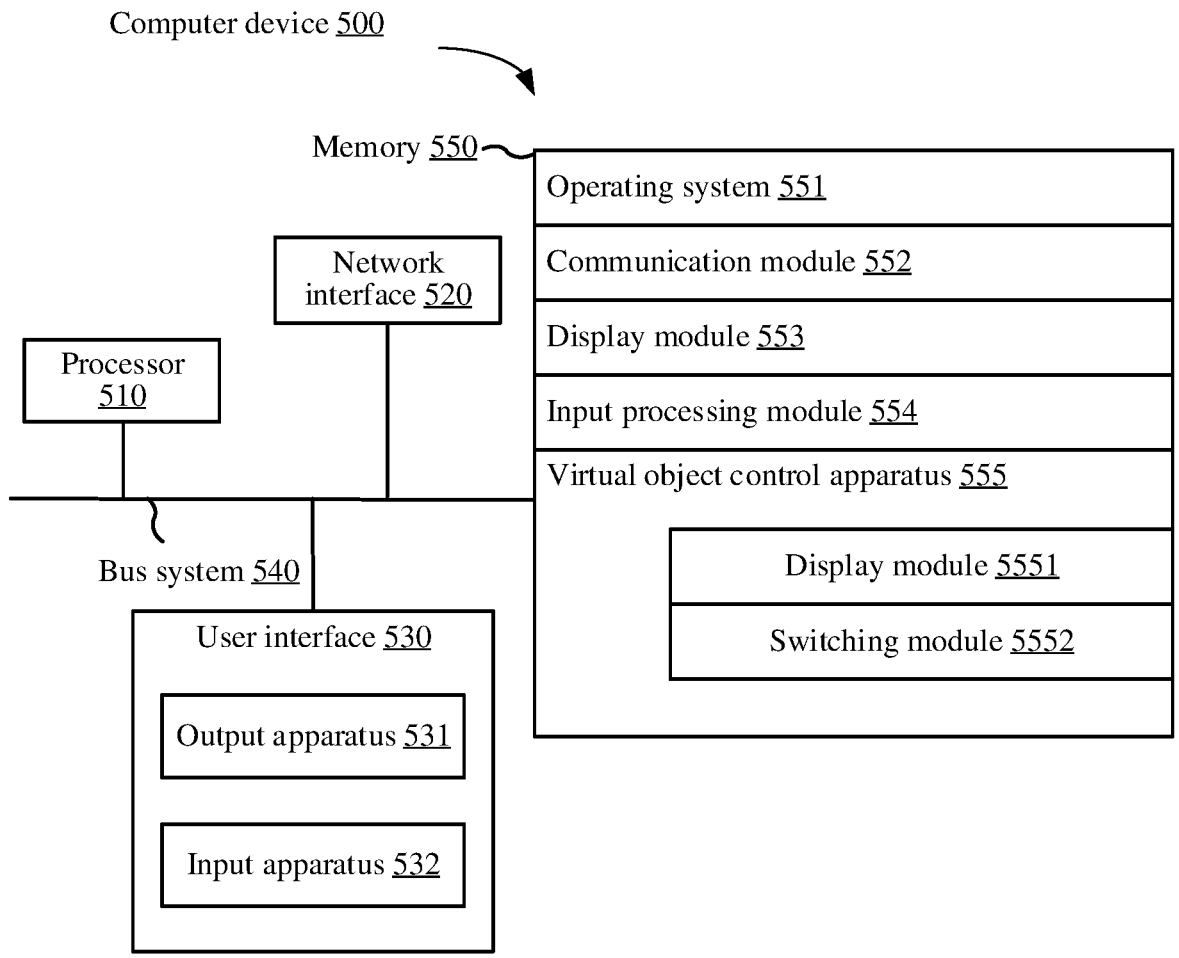
FIG. 2 is a schematic structural diagram of a computer device 500 according to an embodiment of this application.

FIG. 2 is a schematic structural diagram of a computer device 500 according to an embodiment of this application. In actual application, the computer device 500 may be the terminal or server 200 in FIG. 1. The computer device implementing the virtual object control method in an embodiment of this application is described by using an example in which the computer device is the terminal shown in FIG. 1. The computer device 500 shown in FIG. 2 includes at least one processor 510, a memory 550, at least one network interface 520, and a user interface 530. Various components in the computer device 500 are coupled together via a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 2.

The processor 510 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 530 includes one or more output apparatuses 531 that can display media content, including one or more loudspeakers and/or one or more visual display screens. The user interface 530 further includes one or more input apparatuses 532, including user interface components that facilitate inputting of a user, such as a keyboard, a mouse, a microphone, a touch display screen, a camera, and other input button and control.

The memory 550 may be a removable memory, a non-removable memory, or a combination thereof. Exemplary hardware devices include a solid-state memory, a hard disk drive, an optical disc driver, or the like. The memory 550 optionally includes one or more storage devices that are physically away from the processor 510.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in this embodiment of this application is to include any other suitable type of memories.

In some embodiments, the memory 550 may store data to support various operations. Examples of the data include a program, a data structure, or a subset or a superset thereof, which are described below by using examples. Additionally, as used herein, the term module means hardware or a combination of hardware and software configured to perform, execute, or carry out one or more functions. For example, a module can be a circuit, such as an analog circuit, a digital circuit, an integrated circuit (IC), a processor executing instructions stored in a memory to execute the one or more functions, a memory or at least a part of the memory storing instructions executable by a processor to carry out the one or more functions, or any of various combinations thereof.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach another computing device through one or more (wired or wireless) network interfaces 520. Exemplary network interfaces 520 include: Bluetooth, wireless compatible authentication (Wi-Fi), a universal serial bus (USB), and the like.

A display module 553 is configured to display information by using an output apparatus 531 (for example, a display screen or a speaker) associated with one or more user interfaces 530 (for example, a user interface configured to operate a peripheral and display content and information).

An input processing module 554 is configured to detect one or more user inputs or interactions from one of the one or more input apparatuses 532 and translate the detected input or interaction.

In some embodiments, the virtual object control apparatus provided in this embodiment of this application may be implemented by using software. FIG. 2 shows a virtual object control apparatus 555 of a stored in the memory 550. The virtual object control apparatus 555 may be software in a form such as a program and a plug-in, and includes the following software modules: a display module 5551 and a switching module 5552. These modules are logical modules, and may be randomly combined or further divided based on a function to be performed. The following describes functions of the modules.

In some embodiments, the terminal may implement the virtual object control method provided in this embodiment of this application by running a computer program. For example, the computer program may be a native program or software module in an operating system; or may be a native APP, that is, a program that needs to be installed in the operating system to run, for example, a game APP; or may be an applet, that is, a program that only needs to be downloaded to a browser environment to run; or may further be an applet that can be embedded in any APP. In summary, the computer program may be an APP, a module, or a plug-in in any form.

The following describes the virtual object control method provided in the embodiments of this application. During actual implementation, the virtual object control method provided in the embodiments of this application may be independently implemented by a server or a terminal, or may be implemented by a server and a terminal in cooperation.

Figure 3:
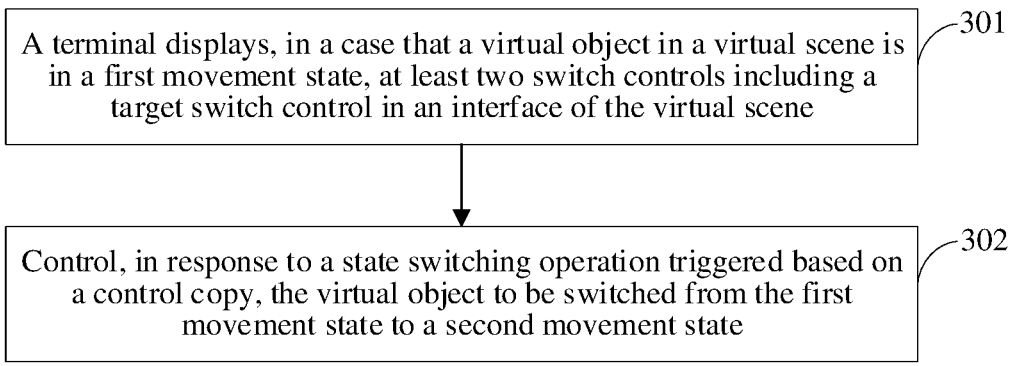
FIG. 3 is a schematic flowchart of a virtual object control method according to an embodiment of this application.

FIG. 3 is a schematic flowchart of a virtual object control method according to an embodiment of this application. A description is made with reference to steps shown in FIG. 3.

Step 301: A terminal displays, in response to a virtual object in a virtual scene being in a first movement state, at least two switch controls including a target switch control in an interface of the virtual scene, a switching control other than the target switch control in the at least two switch controls being a control copy of the target switch control, and a display position of the control copy being different from a display position of the target switch control.

In actual application, an APP supporting a virtual scene is installed and run on the terminal. The APP may be any one of a FPS game, a third-person shooter game, a MOBA game, a virtual reality APP, a three-dimensional map program, a military simulation program, or a multiplayer gunfight survival game. A user may use the terminal to operate a virtual object located in a virtual scene to perform activities. The activities include, but are not limited to: at least one of adjusting body postures, crawling, walking, running, riding, jumping, driving, picking, shooting, attacking, and throwing. For example, the virtual object is a virtual character such as a simulated character role or a cartoon character role.

When a player opens the APP on the terminal, and the terminal runs the APP, the terminal displays a picture of a virtual scene. The picture of the virtual scene herein is obtained by observing the virtual scene from a first-person perspective, or is obtained by observing the virtual scene from a third-person perspective. The picture of the virtual scene includes interactive objects and an object interaction environment, for example, a first virtual object and a second virtual object in a hostile relationship interact in the virtual scene.

During actual implementation, a movement state of the virtual object may be a walking state, a running state, a sprinting state, a crawling state, a jumping state, a sliding state, and the like. The first movement state herein may be any one of the foregoing movement states. Switching between the movement states can be implemented by using the switch control (including the target switch control and the control copy of the target switch control), that is, the movement state of the virtual object is switched from the first movement state to another state, for example, switched from a sprinting state to a sliding state. A state switching operation herein may be triggered based on any one of the at least two switch controls. After the state is switched, the movement state of the virtual object may be fixed, for example, the switched movement state may be set to a sliding state, or may be correspondingly determined according to the first movement state, for example, when the first movement state is a sprinting state, the switched movement state is a sliding state, and when the first movement state is a walking state, the switched movement state is a running state.

In some embodiments, before displaying the at least two switch controls including the target switch control in the interface of the virtual scene, the terminal may also display a direction joystick control in the interface of the virtual scene, determine, in response to a drag operation for the direction joystick control, a dragged distance of the drag operation, and control the virtual object to move in the first movement state when the dragged distance reaches a target distance.

During actual implementation, the direction joystick control is used for controlling a movement direction of the virtual object. The terminal obtains a start position and an end position of the drag operation triggered by the user, in which the start position (that is, a position on which the user touches a direction joystick) and the end position (that is, a position on which the user releases the direction joystick) of the drag operation may be recorded in a form of coordinates; determines the dragged distance of the drag operation based on the start position and the end position; and compares the dragged distance with the target distance. If the dragged distance reaches the target distance, the virtual object is controlled to move in the first movement state, otherwise, another operation is performed, for example, the virtual object is controlled to move in another movement state.

Figure 4:
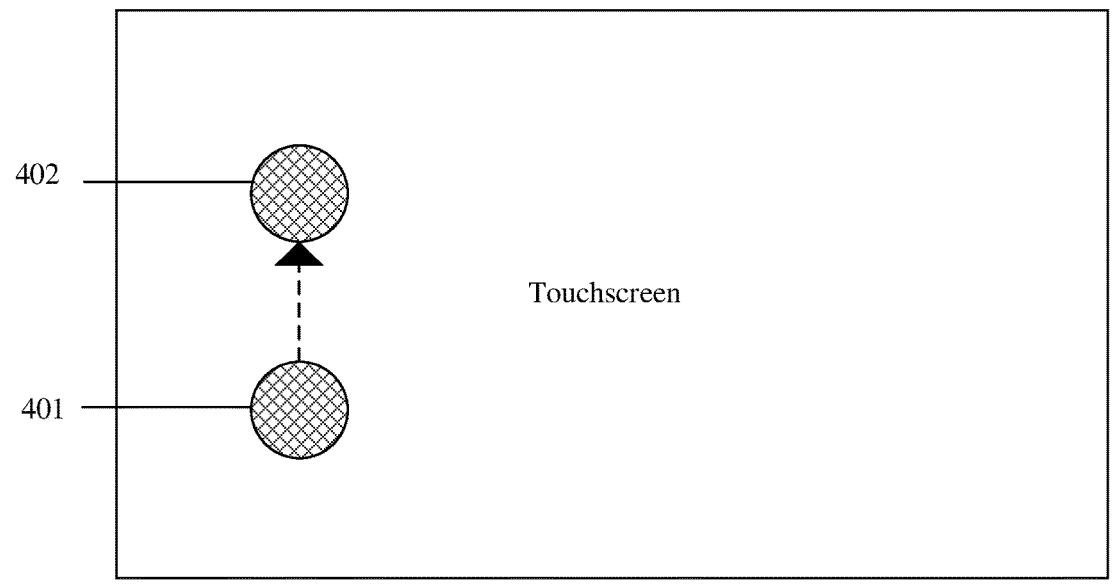
FIG. 4 is a schematic diagram of a drag operation according to an embodiment of this application.

For example, FIG. 4 is a schematic diagram of a drag operation according to an embodiment of this application. Referring to FIG. 4, a start position of the drag operation is 401, an end position of the drag operation is 402, and coordinates (x1, y1) of the start position and coordinates of the end position (x2, y2) are obtained. Based on the coordinates (x1, y1) of the start position and the coordinates of the end position (x2, y2), a distance between the start position and the end position is calculated to obtain the dragged distance of the drag operation. The dragged distance is then compared with the target distance. When it is determined that the dragged distance reaches the target distance, the virtual object is controlled to move in the first movement state.

In some embodiments, before displaying the at least two switch controls including the target switch control in the interface of the virtual scene, the terminal may also display a direction joystick control in the interface of the virtual scene, determine, in response to a drag operation for the direction joystick control, a dragged direction indicated by the drag operation and the dragged distance, and control the virtual object to move in the first movement state when the dragged direction is consistent with a target dragged direction and the dragged distance reaches a target distance.

Figure 5:
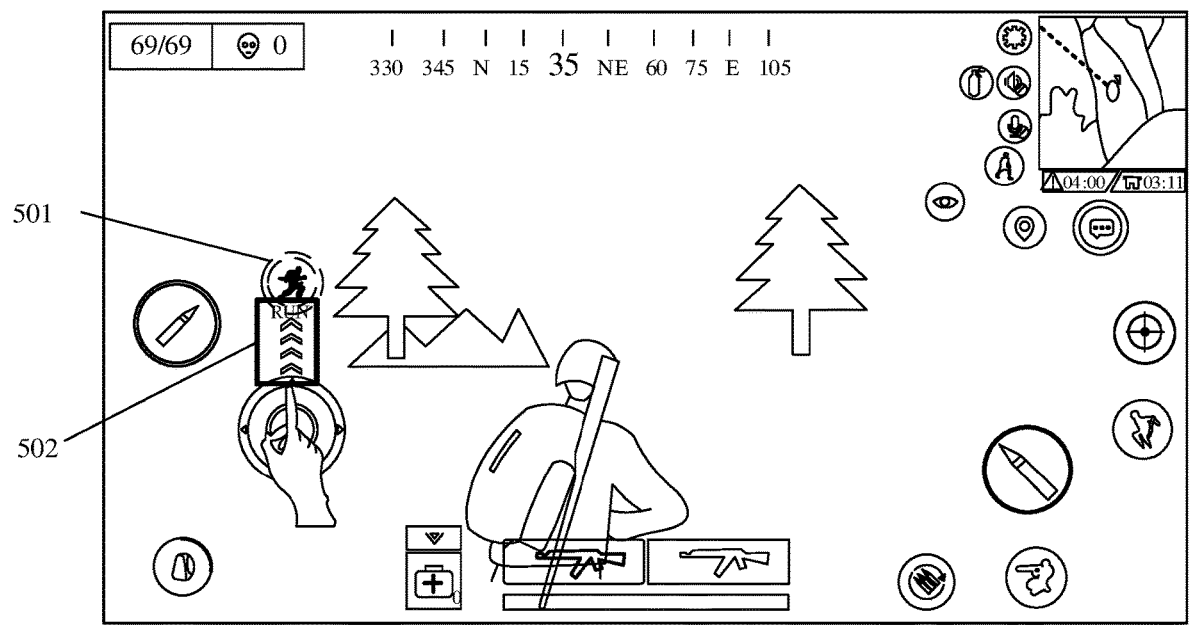
FIG. 5 is a schematic diagram of an interface of a virtual scene according to an embodiment of this application.

During actual implementation, the target dragged direction and the dragged distance may be preset, and prompt information corresponding to the target dragged direction and the dragged distance may be displayed herein on a picture of the virtual scene, to instruct a user to perform a corresponding drag operation. For example, an example in which the first movement state is a sprinting state is used. FIG. 5 is a schematic diagram of an interface of a virtual scene according to an embodiment of this application. Referring to FIG. 5, a direction joystick control and prompt information are displayed on the interface of the virtual scene. The prompt information includes an arrow 501 and a sprint icon 502, the arrow 501 being used for indicating a target dragged direction, and the arrow 501 and the sprint icon 502 being used for indicating a target distance together, that is, a distance, in a direction indicated by the arrow, between the direction joystick control 503 and the sprint icon 502 is the target distance.

In some embodiments, the at least two switch controls including the target switch control are displayed only when the virtual object moves in the virtual scene in the first movement state. The at least two switch controls herein may be newly displayed, that is, when the virtual object is in another state other than the first movement state and the second movement state, the at least two switch controls are not displayed, or only some of the at least two switch controls are displayed. The at least two switch controls are displayed only when the virtual object moves in the virtual scene in the first movement state. In this way, display resources can be reduced. For example, when the virtual object is in a standing state, no switch control copy and target switch control are displayed. When a drag operation for the direction joystick control is received and a dragged distance reaches the target distance, the virtual object is controlled to move in the sprinting state, and the at least two switch controls, namely, the target switch control and the switch control copy are displayed; or, some or all of the at least two switch controls herein may always be displayed in the picture of the virtual scene. When the virtual object is in the first movement state, the displayed switch control is set to an active state, and the switch control can be triggered only when the switch control is in the active state.

In some embodiments, the terminal may display the at least two switch controls including the target switch control in the interface of the virtual scene in the following manner: displaying the target switch control in the interface of the virtual scene, and switching the direction joystick control to a control copy of the target switch control.

During actual implementation, an original control in the interface of the virtual scene may be switched to the control copy of the target switch control, so as to avoid a waste of display resources while displaying the at least two switch controls. To switch the direction joystick control to the control copy of the target switch control, the control copy of the target switch control may be added to the original direction joystick control to display a combined control including the control copy of the direction joystick control and the target switch control, or display of the direction joystick control may be directly canceled, and the control copy of the target switch control is displayed in a display region of the direction joystick control.

Figure 6:
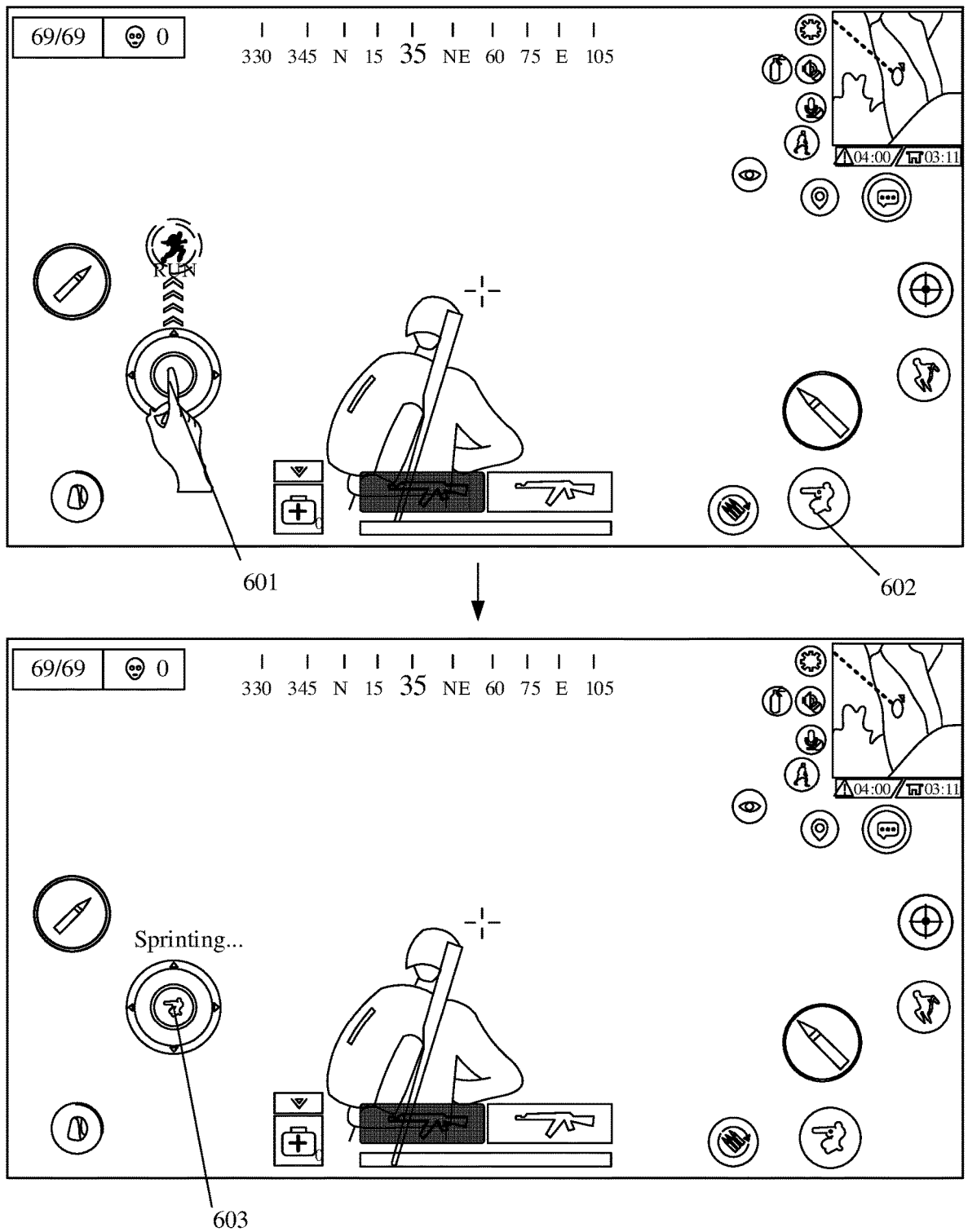
FIG. 6 is a schematic diagram of an interface of a virtual scene according to an embodiment of this application.

In an example, FIG. 6 is a schematic diagram of an interface of a virtual scene according to an embodiment of this application. Referring to FIG. 6, a direction joystick control 601 and a target switch control 602 are displayed in the interface of the virtual scene. After performing a drag operation for the target switch control and dragging the direction joystick control to a specific region, the user controls the virtual object to be in a sprinting state, and a switch button 603 is displayed in the middle of the direction joystick control to switch the direction joystick control to a control copy of the target switch control.

When the control copy of the target switch control is displayed, the control copy may be differently displayed, for example, a breathing light effect corresponding to the control copy is displayed to prompt the user to trigger the control copy. For example, referring to FIG. 6, a corresponding breathing light effect is displayed while displaying the switch button 603. During actual implementation, a duration of the differentiated display may be preset, for example, a duration of the differentiated display may be set to 2 seconds, and timing may start when the virtual object is switched from another state to the first movement state. When the duration reaches 2 seconds, the breathing light effect is canceled.

In some embodiments, the terminal may display at least two switch controls including the target switch control in the interface of the virtual scene in the following manner: displaying the target switch control in the interface of the virtual scene, and displaying the control copy of the target switch control in a suspension state. Correspondingly, the terminal may further control, in response to a drag operation for the control copy, the control copy to move in the interface of the virtual scene; and control the control copy to be at a released position of the drag operation in response to the drag operation being released.

During actual implementation, the control copy of the target switch control may be set to be movable, and a position of the control copy is adjusted through a drag operation. In this way, the user can adjust the position of the control copy according to needs, to move the control copy to a position that conforms to operating habits of the user, thereby further improving human-computer interaction efficiency.

In actual application, the control copy of the target switch control may be displayed in the suspension state, so that the control copy is suspended on the interface of the virtual scene. Correspondingly, the user may perform the drag operation for the control copy, and the terminal obtains a position (that is, a position on which the user touches) corresponding to the drag operation, and controls the control copy to move with the drag operation. During the movement, the position of the control copy is consistent with the position on which the user touches. When the drag operation is released, the released position of the drag operation is obtained, and the released position is a final position of the control copy.

Figure 7:
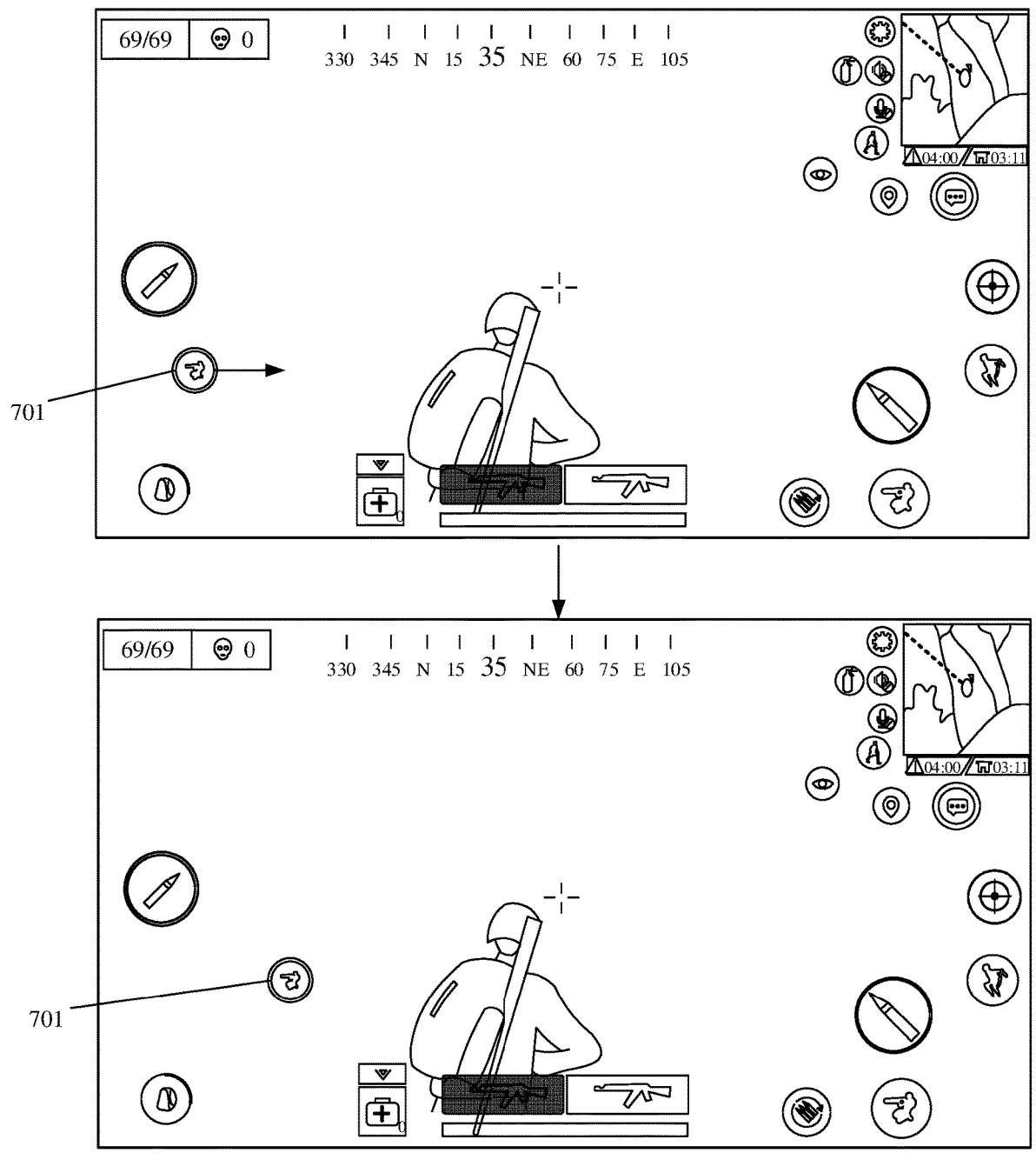
FIG. 7 is a schematic diagram of an interface of a virtual scene according to an embodiment of this application.

For example, FIG. 7 is a schematic diagram of an interface of a virtual scene according to an embodiment of this application. Referring to FIG. 7, on the interface of the virtual scene, a control copy 701 of a target switch control is displayed in a suspension state, and the user performs drag operation for the control copy, for example, drags the control copy to the right, to control the control copy 701 to move right.

In some embodiments, the terminal may display at least two switch controls including the target switch control in the interface of the virtual scene in the following manner: displaying, in event that the interface of the virtual scene includes at least two regions, a switch control in each of the regions.

Figure 8:
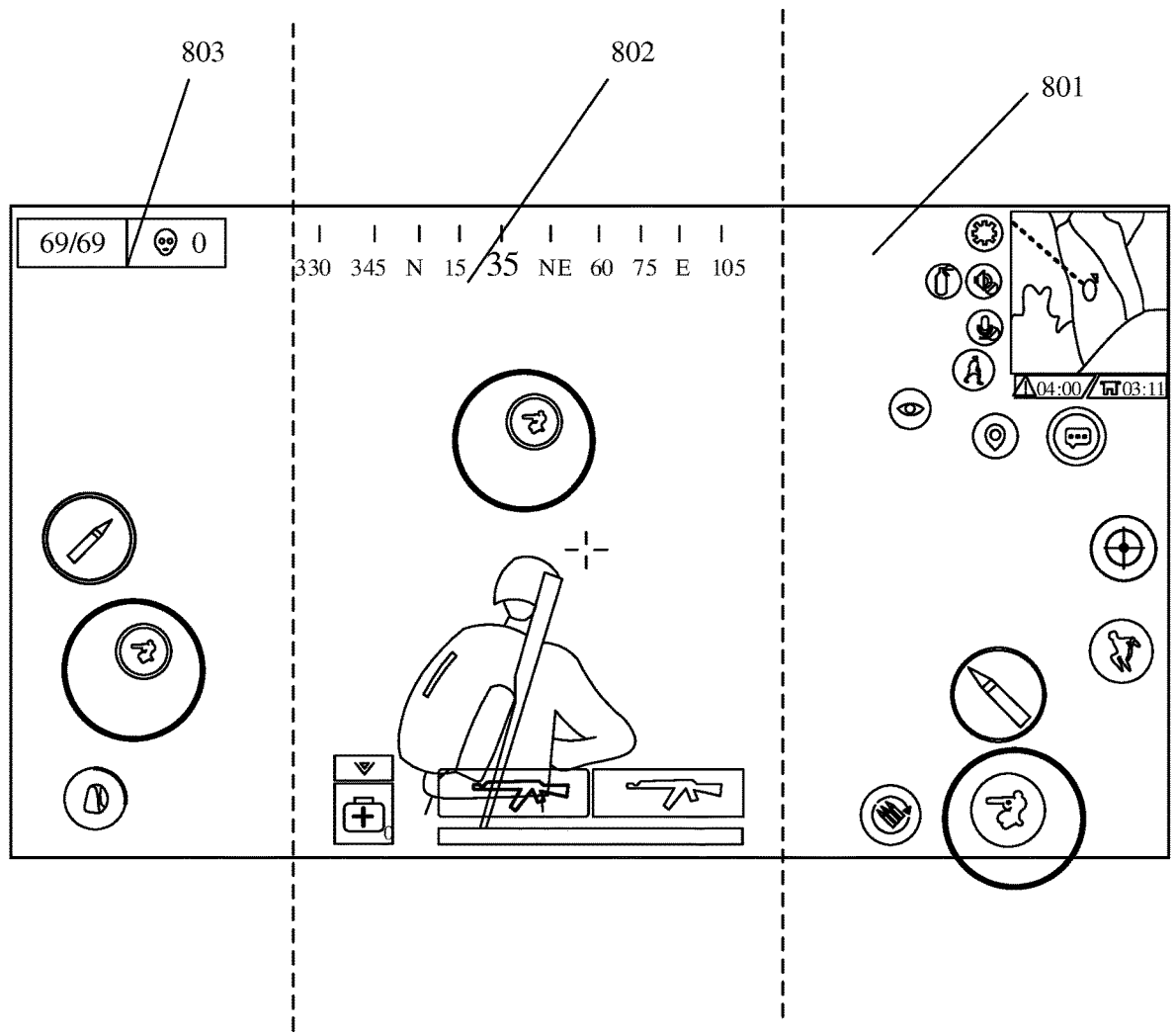
FIG. 8 is a schematic diagram of an interface of a virtual scene according to an embodiment of this application.

During actual implementation, the interface of the virtual scene may be divided into two regions in advance, for example, the interface of the virtual scene is divided from the middle into a left half region and a right half region, and a switch control is displayed in each of the left half region and the right half region. For example, FIG. 8 is a schematic diagram of an interface of a virtual scene according to an embodiment of this application. Referring to FIG. 8, the interface of the virtual scene includes three regions, namely, a region 801, a region 802, and a region 803. A target switch control is displayed in the region 801, and a switch control copy is displayed in each of the region 802 and the region 803.

Step 302. Control, in response to a state switching operation triggered based on the control copy, the virtual object to be switched from the first movement state to the second movement state.

In some embodiments, the terminal may trigger the state switching operation in the following manner: receiving a press operation for the control copy, the press operation being used as the state switching operation. Correspondingly, after controlling the virtual object to be switched from the first movement state to the second movement state, the terminal may further control the virtual object to be in the second movement state before the press operation is released, and control, in response to the press operation being released, the virtual object to be switched from the second movement state to the first movement state.

During actual implementation, the state switching operation may be the press operation, and the terminal monitors the press operation of the user. When the user touches the control copy, the terminal controls the virtual object to be switched from the first movement state to the second movement state, and controls, during the press operation, the virtual object to move in the virtual scene in the second movement state. When the user releases the press operation, that is, the hand of the user leaves the screen, the terminal controls the virtual object to be switched from the second movement state back to the first movement state.

For example, an example in which the first movement state is a sprinting state and the second movement state is a sliding state is used. When pressing the switch control, the user controls the virtual object to be switched from the sprinting state to the sliding state, during the process in which the user presses the switch control, the virtual object moves in the sliding state, and when releasing the switch control, the user controls the virtual object to be switched from the sliding state back to the sprinting state.

After receiving the press operation for the control copy, the terminal displays the control copy in a target display manner, to indicate that the control copy is triggered, for example, the control copy may be displayed in a highlighted form. During actual implementation, in addition to displaying the control copy in the target display manner, other switch controls may further be displayed in the target display manner. For example, when the interface of the virtual scene includes one control copy and one target switch control, the user presses the control copy, and the control copy and the target switch control are both highlighted.

Figure 9:
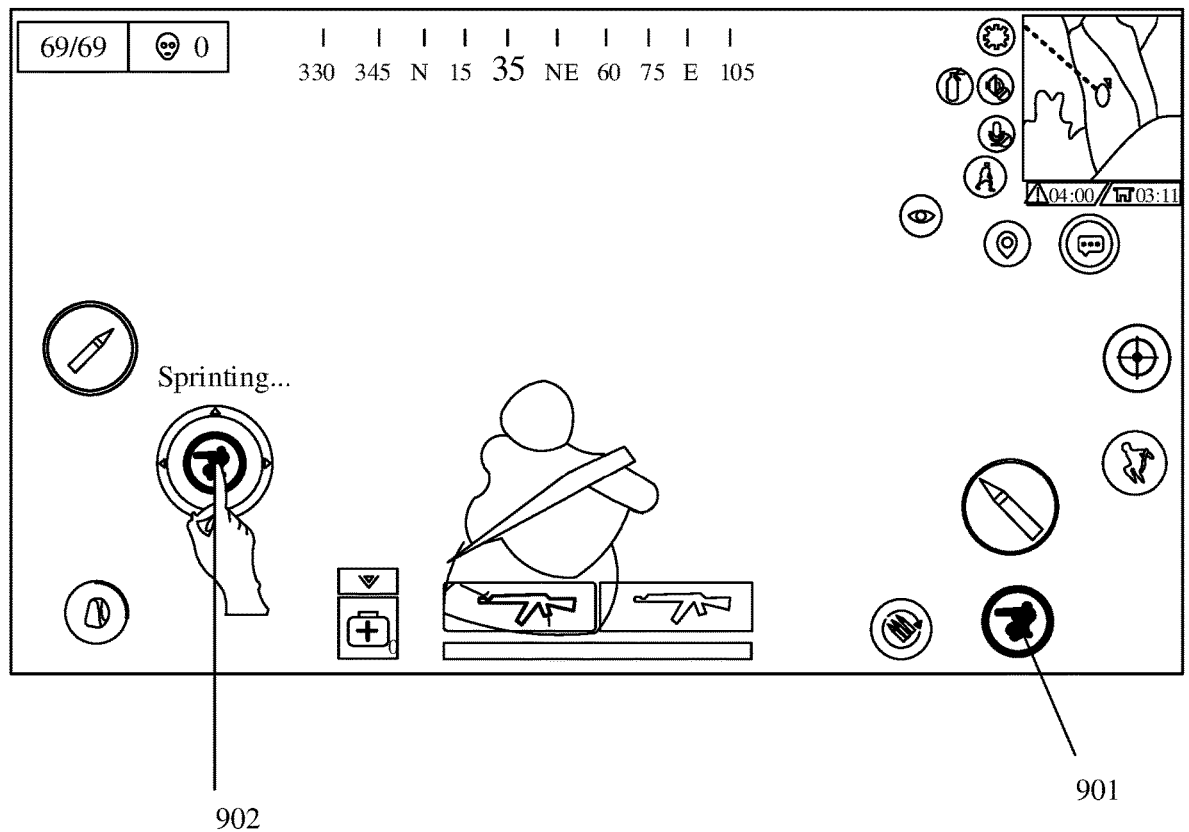
FIG. 9 is a schematic diagram of an interface of a virtual scene according to an embodiment of this application.

For example, FIG. 9 is a schematic diagram of an interface of a virtual scene according to an embodiment of this application. Referring to FIG. 9, during a time period in which the user presses the switch control, a target switch control 901 and a control copy 902 are displayed in a highlighted form.

In some embodiments, the terminal may trigger the state switching operation in the following manner: receiving a first click/tap operation for the control copy, the first click/tap operation being used as the state switching operation. Correspondingly, after controlling the virtual object to be switched from the first movement state to the second movement state, the terminal may further receive a second click/tap operation for the control copy; and control, in response to the second click/tap operation, the virtual object to be switched from the second movement state to the first movement state.

The state switching operation herein may be a click/tap operation. In this way, after performing the click/tap operation, the user may perform other operations without the need to always press the switch control, thereby improving the human-computer interaction efficiency.

During actual implementation, the terminal monitors the click/tap operation of the user. When the user clicks/taps the control copy, the terminal controls the virtual object to be switched from the first movement state to the second movement state, and controls the virtual object to move in the second movement state. During the movement of the virtual object in the second movement state, the user clicks/taps the control copy again, and the terminal controls the virtual object to be switched from the second movement state back to the first movement state.

For example, an example in which the first movement state is a sprinting state and the second movement state is a sliding state is used. When clicking/tapping the control copy for the first time, the user controls the virtual object to be switched from the sprinting state to the sliding state, and controls the virtual object to move in the sliding state. When clicking/tapping the control copy again, the user controls the virtual object to be switched from the sliding state back to the sprinting state.

After receiving the first click/tap operation for the control copy, the terminal displays the control copy in the target display manner, to indicate that the control copy is triggered, for example, the control copy may be displayed in a highlighted form. When receiving the second click/tap operation for the control copy, the terminal cancels the display of the control copy in the target display manner, for example, cancels the highlight.

In some embodiments, when the state switching operation may be the click/tap operation, the first click/tap operation for the control copy is received. The terminal controls the virtual object to be switched from the first movement state to the second movement state, and controls the virtual object to move in the second movement state. During the movement of the virtual object in the second movement state, the user clicks/taps the control copy again, to control the virtual object to be switched from the second movement state to a third movement state.

That is, the control copy herein may be used for implementing switching between a plurality of movement states. For example, when receiving the first click/tap operation for the control copy, the terminal controls the virtual object to be switched from the sprinting state to the sliding state. When receiving the second click/tap operation for the control copy, the terminal controls the virtual object to be switched from the sliding state to a walking state.

In some embodiments, the terminal may further control, in a process in which the virtual object is in the second movement state, the control copy and the target switch control to be in an unselectable state; and control, in response to the virtual object being switched from the second movement state to the first movement state, the control copy and the target switch control to be switched from the unselectable state to a selectable state, to trigger the state switching operation based on the control copy or the target switch control in the selectable state.

During actual implementation, the interface of the virtual scene includes a plurality of switch controls. When the user triggers any one of the switch controls, all the switch controls are set in an unselectable state, that is, the switch controls cannot be triggered again in the process in which the virtual object is in the second movement state. For example, when the interface of the virtual scene includes one target switch control and three control copies, when the user triggers the state switching operation based on one of the three control copies, both the one target switch control and the three control copies are set in an unselectable state.

In actual application, when the virtual object is switched from the second movement state to the first movement state, all the switch controls are set to a selectable state. A target movement distance that the virtual object can move in the second movement state is preset, that is, after moving the target movement distance in the second movement state, the virtual object automatically switches the movement state, and the virtual object is controlled to be switched from the second movement state back to the first movement state; or, a target duration in which the second movement state can last is preset, that is, after moving the target duration in the second movement state, the virtual object automatically switches the movement state, and the virtual object is controlled to be switched from the second movement state back to the first movement state.

In some embodiments, the terminal may further receive a slide operation triggered based on a direction adjustment region in the interface of the virtual scene; and adjust a movement perspective of the virtual object based on a slide direction and a slide distance that correspond to the slide operation, an adjustment direction of the movement perspective being corresponding to the slide direction, and an adjustment angle of the movement perspective being corresponding to the slide distance.

A gesture of the direction adjustment region herein is detected. When the detected gesture is a gesture corresponding to the slide operation, it is determined that the slide operation is received, and the slide direction indicated by the slide operation and the slide distance are obtained. Based on the slide direction and the slide distance, the adjustment direction and the adjustment angle of the movement perspective are determined, for example, the adjustment direction of the movement perspective is consistent with the slide direction, and the adjustment angle is proportional to the slide distance.

Figure 10A:
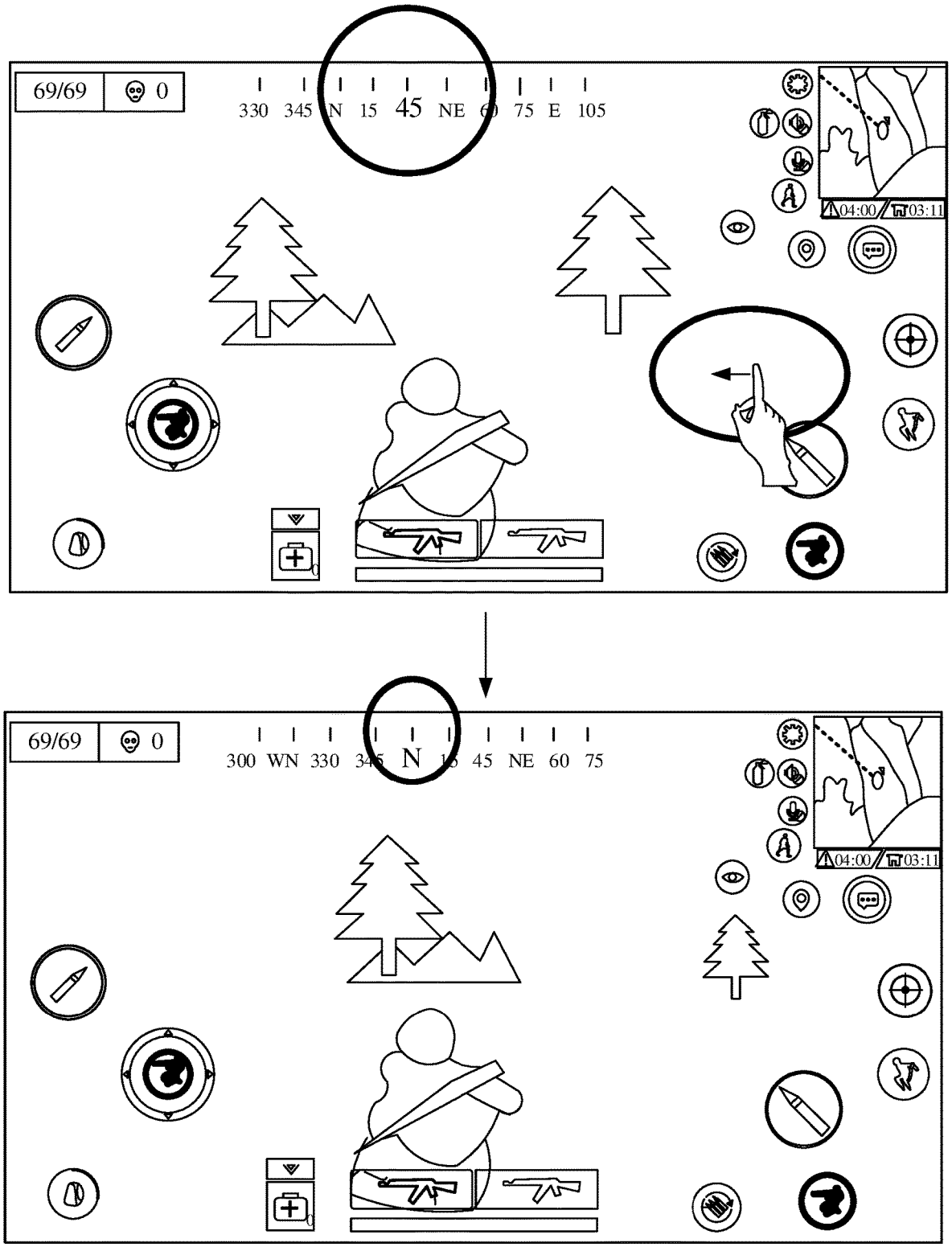
FIG. 10A and FIG. 10B are schematic diagrams of a picture of a virtual scene according to an embodiment of this application.
Figure 10B:
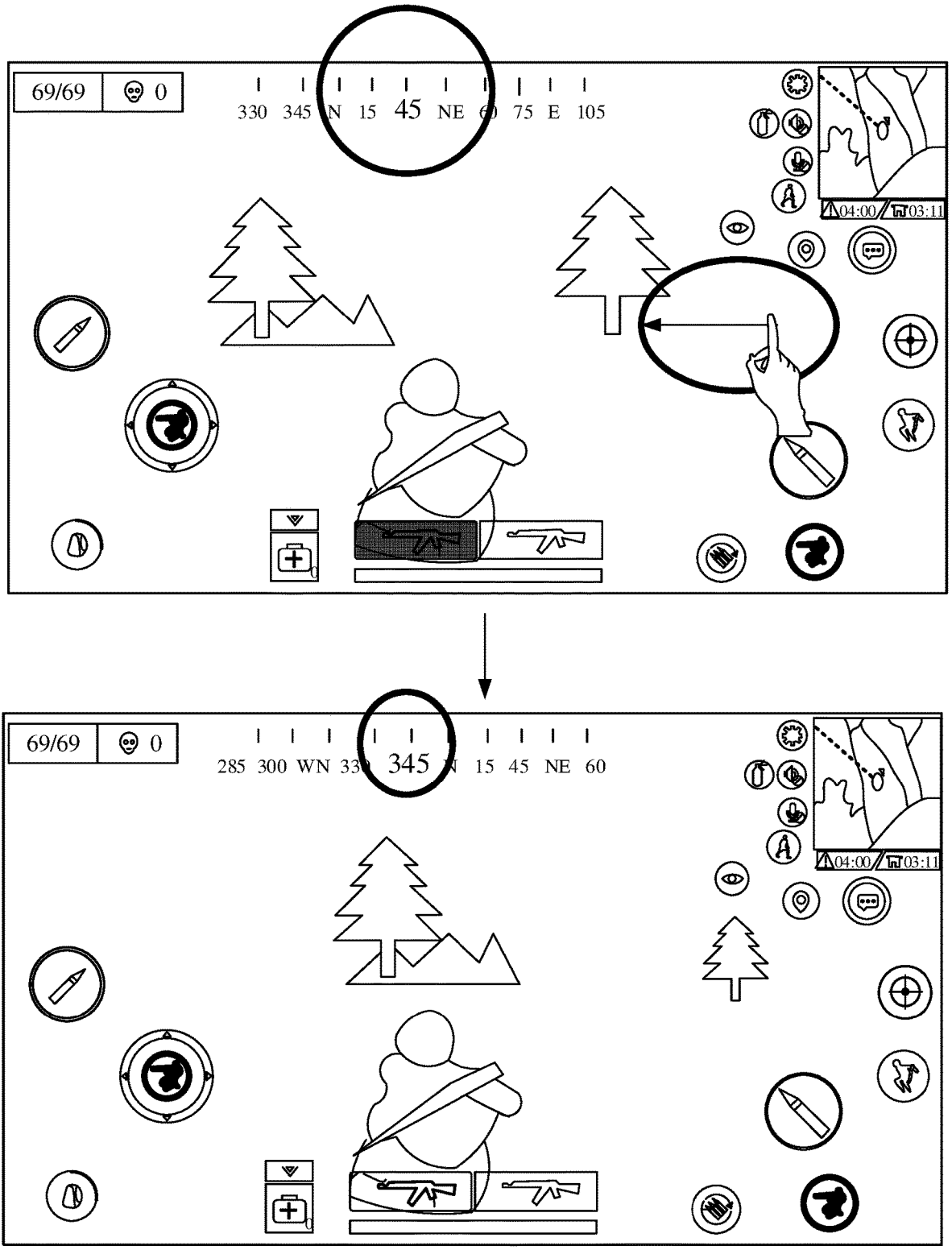

For example, FIG. 10A and FIG. 10B are schematic diagrams of a picture of a virtual scene according to an embodiment of this application. Referring to FIG. 10A and FIG. 10B, slide directions are both to the left, with a virtual object as a center, a viewing angle is controlled to rotate to the left. The slide distance in FIG. 10A is less than the slide distance in FIG. 10B. Correspondingly, a viewing angle in FIG. 10A is rotated from a 45-degree direction to the north direction (360-degree direction), and a viewing angle in FIG. 10B is rotated from a 45-degree direction to a 345-degree direction, that is, the adjustment angle in FIG. 10A is less than the adjustment angle in FIG. 10B.

In some embodiments, the control copy is a combined control including a steering wheel and a switch button, and the terminal may further receive a direction adjustment operation triggered based on the steering wheel; obtain a trigger position of the direction adjustment operation on the steering wheel; and adjust a movement perspective of the virtual object according to a direction indicated by the trigger position.

Figure 11:
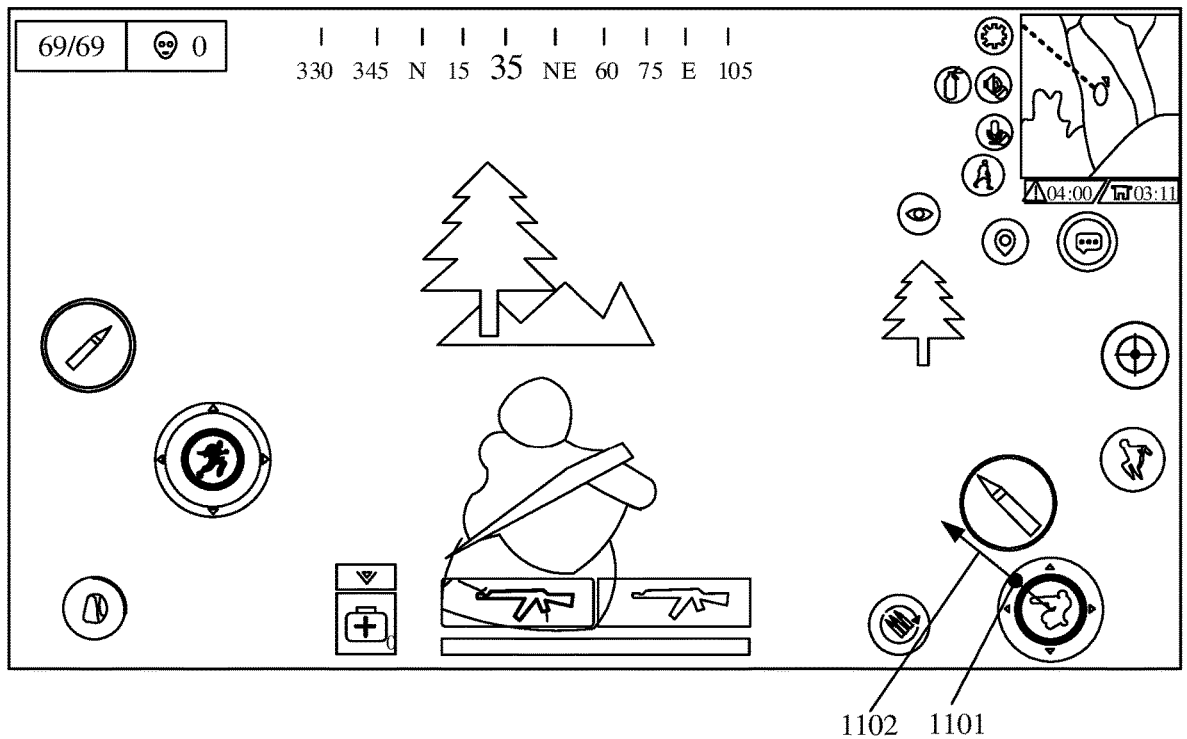
FIG. 11 is a schematic diagram of an interface for displaying a control copy according to an embodiment of this application.

During actual implementation, the direction adjustment operation may be a click/tap operation. According to a click/tap position corresponding to the click/tap operation, a direction to which a center of the wheel points the click/tap operation is used as the direction indicated by the trigger position. For example, FIG. 11 is a schematic diagram of an interface for displaying a control copy according to an embodiment of this application. 1101 is the click/tap position corresponding to the click/tap operation, and a direction indicated by an arrow 1102 is the direction indicated by the trigger position.

Figure 12:
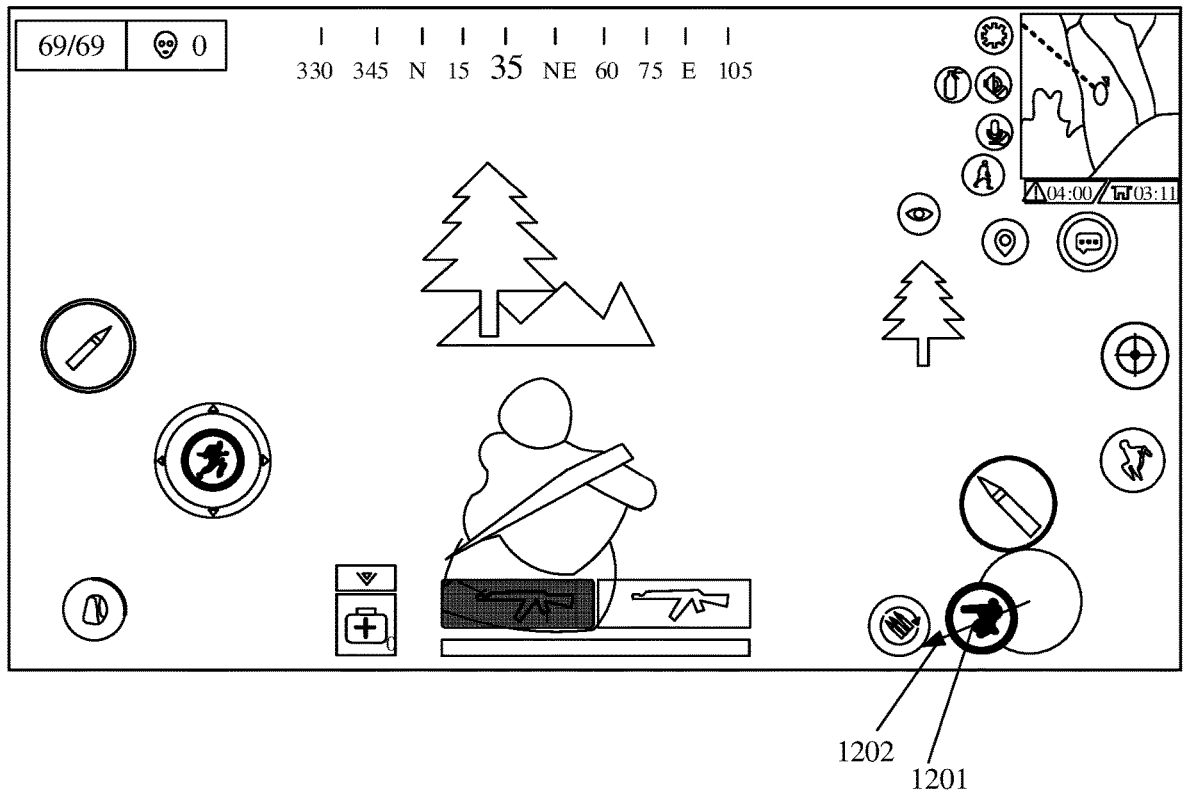
FIG. 12 is a schematic diagram of an interface for displaying a control copy according to an embodiment of this application.

In some embodiments, the switch button is in the middle of the steering wheel, and the direction adjustment operation may be a drag operation for the switch button, to control the switch button to rotate in the steering wheel. A position of the switch button on the steering wheel is used as a trigger position of the direction adjustment operation on the steering wheel. For example, FIG. 12 is a schematic diagram of an interface for displaying a control copy according to an embodiment of this application. A position of a switch button 1201 on the steering wheel is obtained, and the position is used as a trigger position, correspondingly, a direction indicated by the trigger position is a direction indicated by an arrow 1202.

In some embodiments, the terminal may further control, in event that the control copy is a combined control including a direction joystick and a switch button, and in response to a drag operation for the direction joystick, the virtual object to move in the second movement state toward a direction indicated by the drag operation.

During actual implementation, in a process in which the virtual object moves in the second movement state, a movement direction of the virtual object may further be controlled by using the direction joystick control. A direction indicated by a dragged direction corresponding to a joystick drag operation herein is the movement direction, for example, the virtual object is dragged to move to the left.

In some embodiments, the state switching operation is a press operation for the control copy, and the terminal may further obtain a pressure value corresponding to the press operation; and control, based on the pressure value, the virtual object to move in the second movement state at a speed corresponding to the pressure value.

During actual implementation, a correspondence between the pressure value and the speed may be preset, for example, the pressure value may be proportional to a movement speed, that is, a greater pressure value indicates that a corresponding speed is higher, and the virtual object is controlled to be move in the second movement state according to the correspondence between the pressure value and the movement speed. In this way, in addition to controlling the virtual object to move in the second movement state, the movement speed of the virtual object can be controlled without the need to trigger another button, thereby improving the human-computer interaction efficiency.

With the application of this embodiment of this application, the user may select one switch control from the at least two switch controls according to operating habits of the user, to realize switching between movement states and improve the human-computer interaction efficiency.

Figure 13:
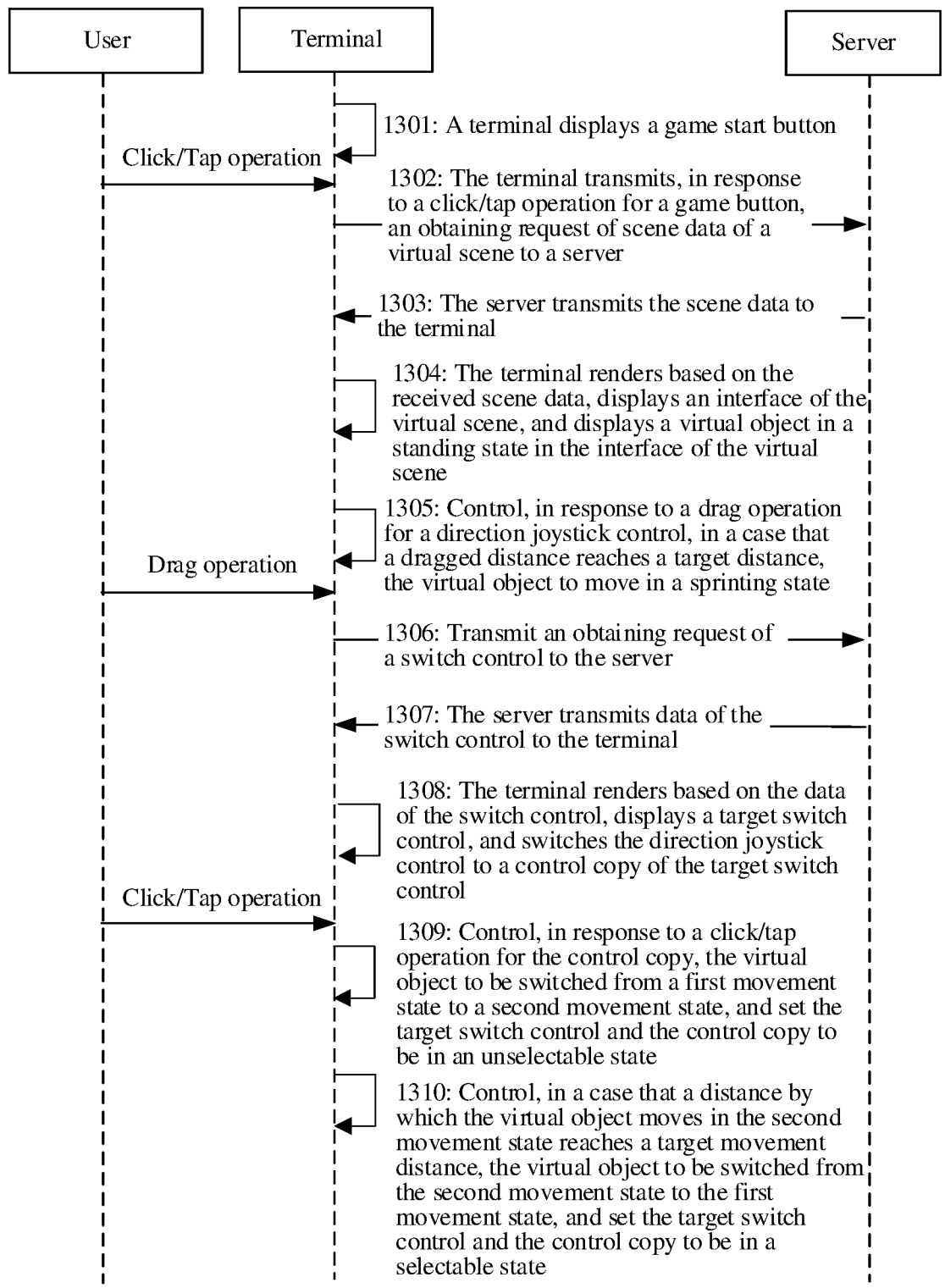
FIG. 13 is a schematic flowchart of a virtual object control method according to an embodiment of this application.

The virtual object control method provided in this embodiment of this application is described by using an example in which a first movement state is a sprinting state and a second movement state is a sliding state. The virtual object control method is implemented by a server and a terminal in cooperation. FIG. 13 is a schematic flowchart of a virtual object control method according to an embodiment of this application. Referring to FIG. 13, the virtual object control method provided in this embodiment of this application includes the following steps:

Step 1301: The terminal displays a game start button.

Step 1302: The terminal transmits, in response to a click/tap operation for a game button, an obtaining request of scene data of a virtual scene to the server.

Step 1303: The server transmits the scene data to the terminal.

Step 1304: The terminal renders based on the received scene data, displays an interface of the virtual scene, and displays a virtual object in a standing state in the interface of the virtual scene.

Step 1305: Control, in response to a drag operation for a direction joystick control and a dragged distance reaching a target distance, the virtual object to move in a sprinting state.

Step 1306: Transmit an obtaining request of a switch control to the server.

Step 1307: The server transmits data of the switch control to the terminal.

Step 1308: The terminal renders based on the data of the switch control, displays a target switch control, and switches the direction joystick control to a control copy of the target switch control.

Step 1309: Control, in response to a click/tap operation for the control copy, the virtual object to be switched from the first movement state to the second movement state, and set the target switch control and the control copy to be in an unselectable state.

Step 1310: Control, in event that a distance by which the virtual object moves in the second movement state reaches a target movement distance, the virtual object to be switched from the second movement state to the first movement state, and set the target switch control and the control copy to be in a selectable state.

In this way, a user may trigger a state switching operation again based on the target switch control or the control copy in the selectable state.

With the application of this embodiment of this application, a user may select one switch control from the at least two switch controls according to operating habits of the user, to realize switching between movement states and improve the human-computer interaction efficiency.

The following describes an exemplary application of this embodiment of this application in an actual application scenario. The virtual object control method provided in the embodiments of this application is described by using an example in which a first movement state is a sprinting state and a second movement state is a sliding state.

Figure 14:
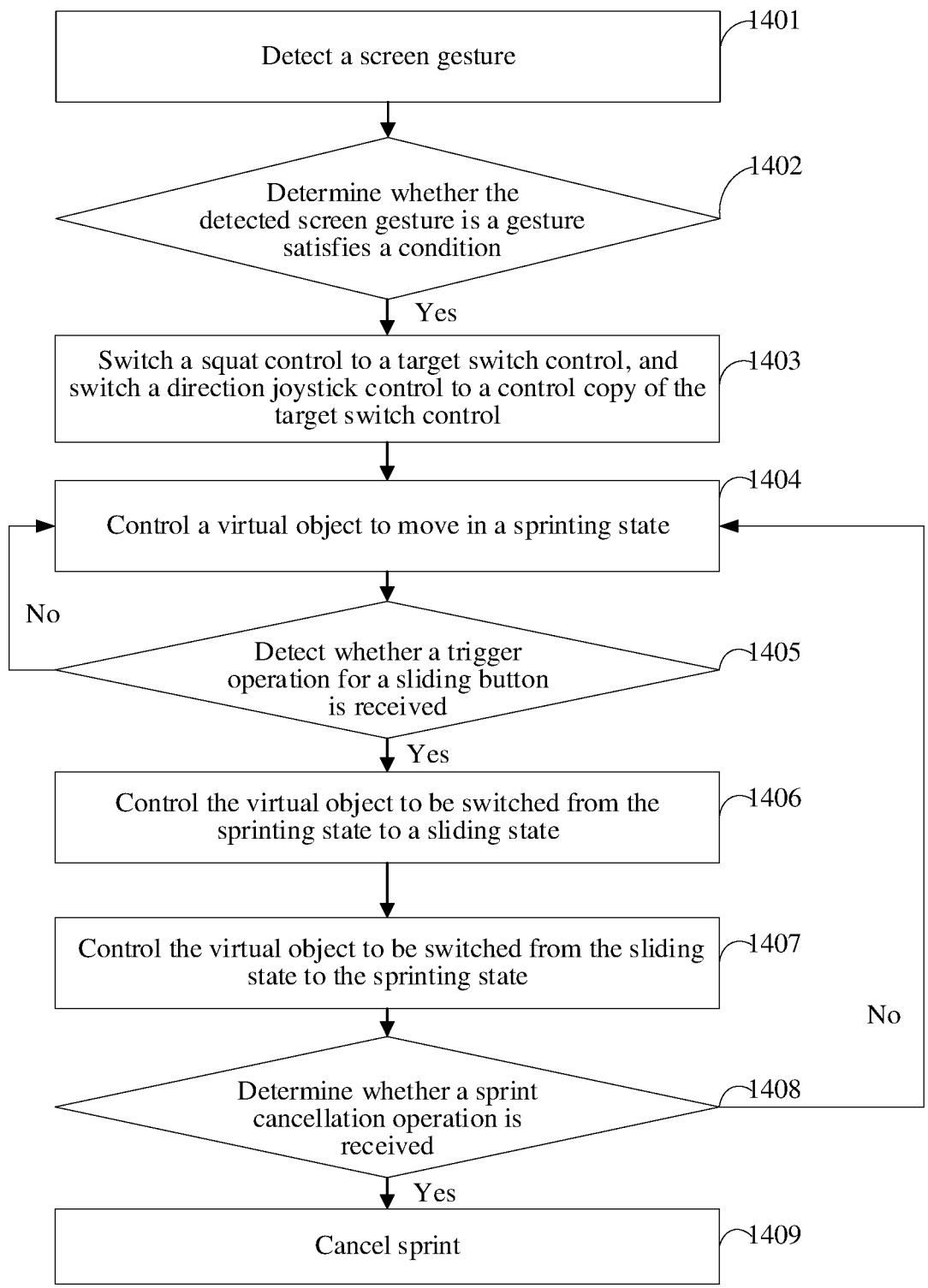
FIG. 14 is a schematic flowchart of a virtual object control method according to an embodiment of this application.

FIG. 14 is a schematic flowchart of a virtual object control method according to an embodiment of this application. Referring to FIG. 14, the virtual object control method provided in this embodiment of this application includes the following steps:

Step 1401: Detect a screen gesture.

Step 1402: Determine whether the detected screen gesture is a gesture satisfies a condition, if yes, perform 1403.

During actual implementation, whether a drag operation for a direction joystick control is received is determined. If the drag operation is received, whether a joystick is dragged to a specific region is further determined, if yes, a virtual object is controlled to be in a sprinting state.

The drag operation for the direction joystick control detected on a screen of a mobile device mainly includes two events, namely, a trigger event when touch starts and a trigger event when the touch ends. According to event data, a position on which the touch starts and a position on which the touch ends are obtained, the positions being represented by coordinates. A processor determines, based on the obtained positions, whether the screen gesture is the drag operation for the joystick and whether the joystick is dragged to the specific region. If yes, it is determined that the screen gesture is the gesture satisfies the condition.

Step 1403: Switch a squat control to a target switch control, and switch the direction joystick control to a control copy of the target switch control.

Figure 15:
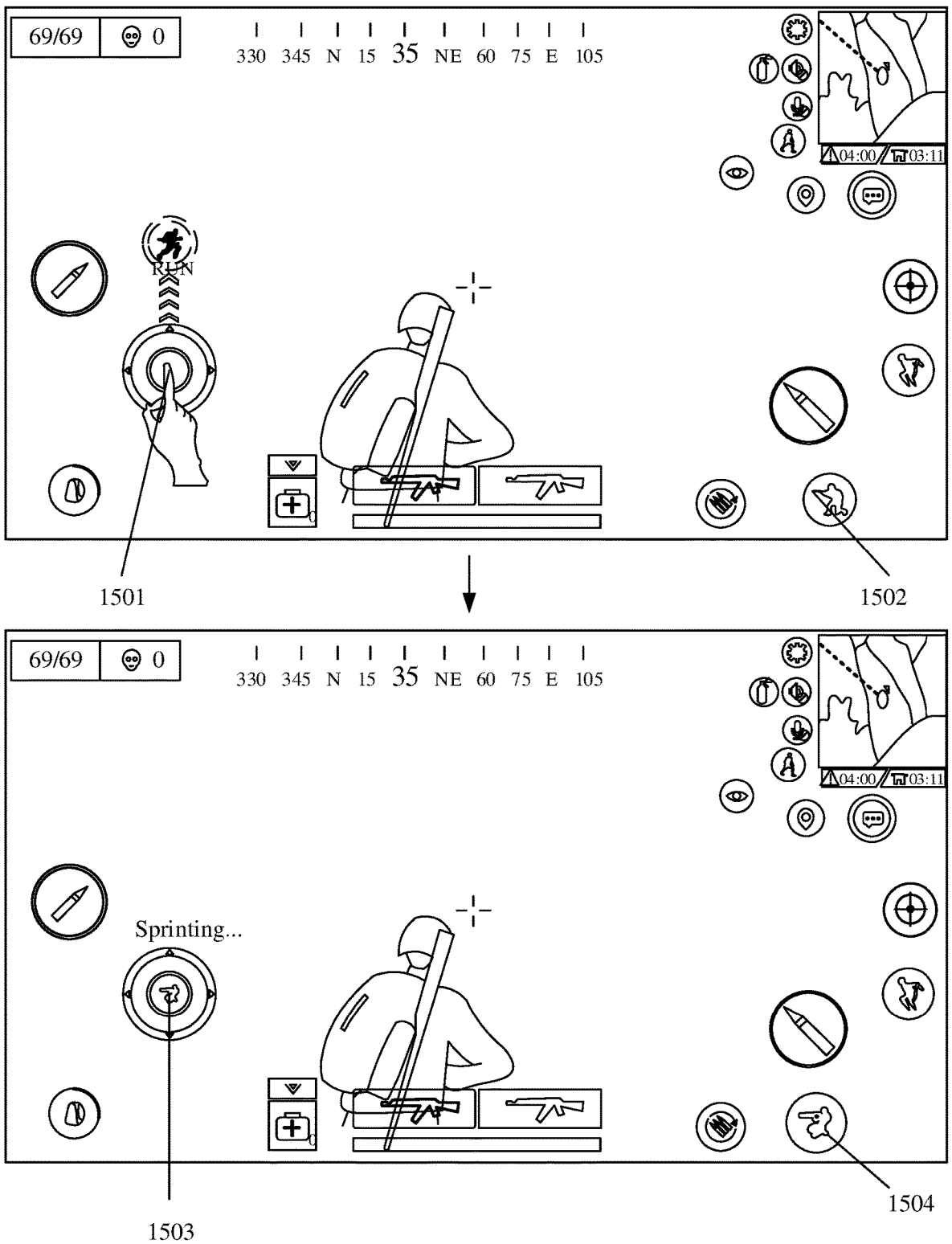
FIG. 15 is a schematic diagram of an interface of a virtual scene according to an embodiment of this application.

FIG. 15 is a schematic diagram of an interface of a virtual scene according to an embodiment of this application. Referring to FIG. 15, a direction joystick control 1501 and a squat control 1502 are displayed in the interface of the virtual scene. After performing a drag operation for the direction joystick control and dragging the direction joystick control to a specific region, a user controls a virtual object to be in a sprinting state, and a switch button 1503 is displayed in the middle of the direction joystick control to switch the direction joystick control to the control copy of the target switch control, and the squat control 1502 is switched to a target switch control 1504.

Step 1404: Control the virtual object to be in the sprinting state.

Step 1405: Detect whether a trigger operation for a sliding button is received, if yes, perform step 1406, otherwise, perform step 1404.

The trigger operation herein may be a click/tap operation or a touch and hold operation.

Figure 16:
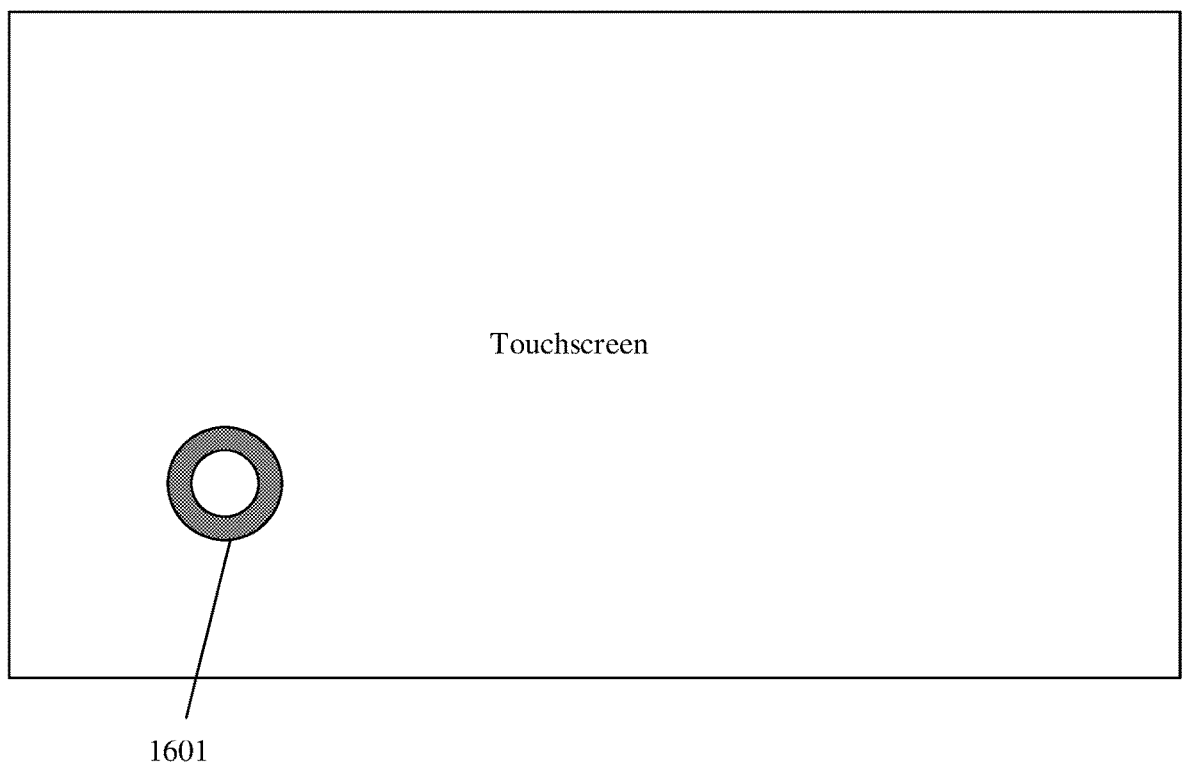
FIG. 16 is a schematic diagram of an interface of a virtual scene according to an embodiment of this application.

For example, FIG. 16 is a schematic diagram of an interface of a virtual scene according to an embodiment of this application. Referring to FIG. 16, the user clicks/taps a sliding button 1601 located on a direction joystick control. When the processor detects that the sliding button is a click/tap gesture, after the processor collects event data, a control unit controls the sliding button to display in a highlighted state, and the processor controls the virtual object to perform sliding action.

Step 1406: Control the virtual object to be switched from the sprinting state to the sliding state.

In addition to controlling the virtual object to be switched from the sprinting state to the sliding state, the target switch control and the control copy are highlighted.

Step 1407: Control the virtual object to be switched from the sliding state to the sprinting state.

When the trigger operation herein is a press operation, and when the user releases the control copy, the highlighting of the target switch control and the control cop is canceled, the sprinting state ends, and the virtual object is controlled to be switched from the sliding state to the sprinting state. During actual implementation, the virtual object may be controlled, in other manners, to be switched from the sliding state to the sprinting state, for example, after moving a target movement distance in the sliding state, the virtual object automatically switches back to the sprinting state.

Step 1408: Detect whether a sprint cancellation operation is received, if yes, perform step 1409, otherwise, perform step 1404.

Step 1409: Cancel sprint.

When the processor acquires that the virtual object is not in the sprinting state, the sliding button is switched back to the squat button, and the virtual object is controlled to cancel the sprinting action.

Figure 17:
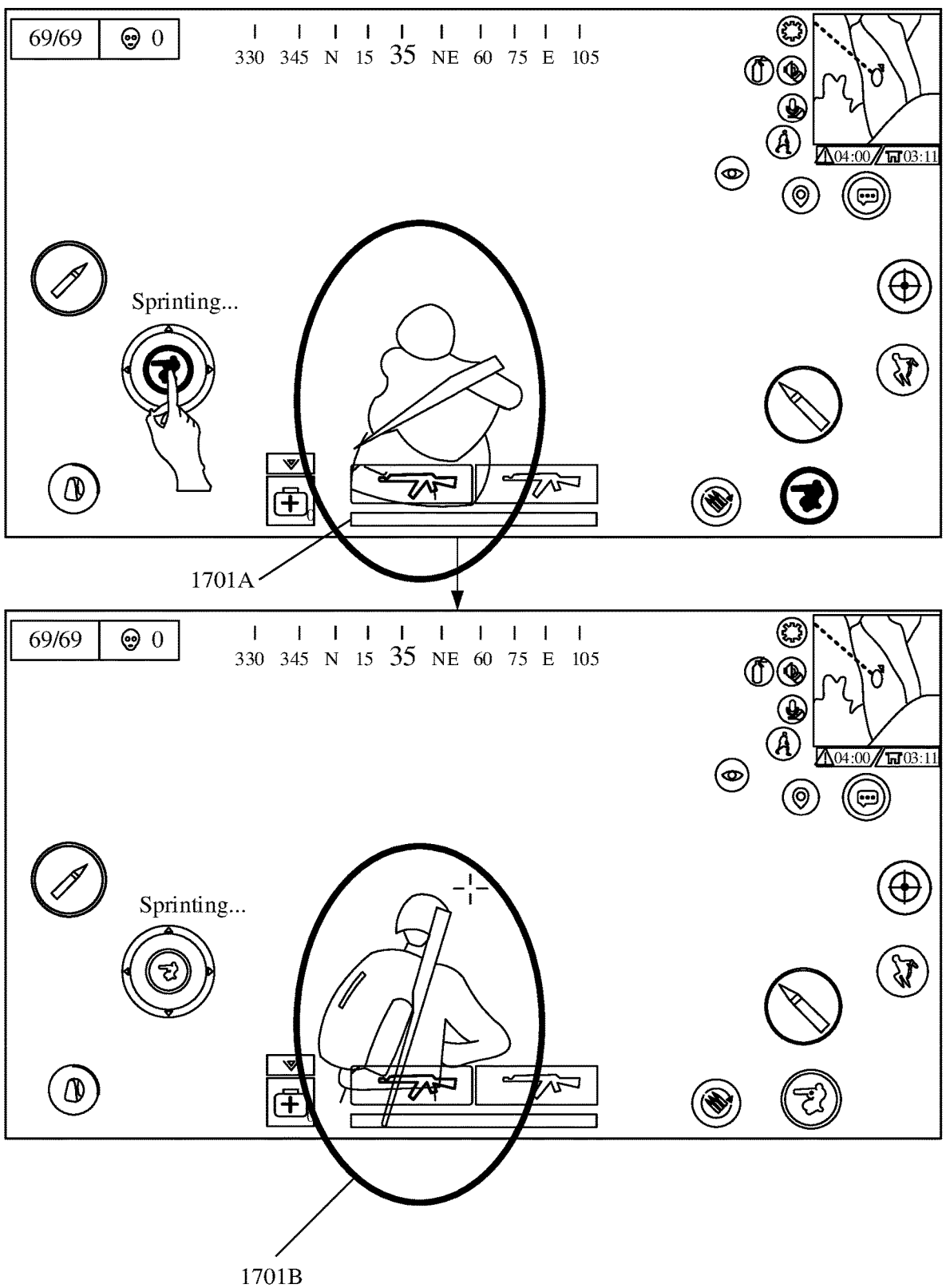
FIG. 17 is a schematic diagram of an interface of a virtual scene according to an embodiment of this application.

FIG. 17 is a schematic diagram of a picture of a virtual scene according to an embodiment of this application. Referring to FIG. 17, a virtual object in the picture of the virtual scene is switched from a sliding state 1701A to a sprinting state 1701B.

The embodiments of this application have the following beneficial effects:

With the application of the foregoing embodiments of this application, a user can select, according to a requirement of the user, a control used for triggering a sliding operation, for example, the sliding operation is triggered through a control copy, to improve the human-computer interaction efficiency.

The following continues to describe an exemplary structure of software modules that implement a virtual object control apparatus 555 provided in the embodiments of this application. In some embodiments, as shown in FIG. 2, software modules in the virtual object control apparatus 555 stored in a memory 550 may include:

the display module 5551, configured to display, in response to a virtual object in a virtual scene being in a first movement state, at least two switch controls including a target switch control in an interface of the virtual scene, a switching control other than the target switch control in the at least two switch controls being a control copy of the target switch control, and a display position of the control copy being different from a display position of the target switch control; and the switching module 5552, configured to control, in response to a state switching operation triggered based on the control copy, the virtual object to be switched from the first movement state to a second movement state.

In some embodiments, the display module is further configured to display a direction joystick control in the interface of the virtual scene; determine, in response to a drag operation for the direction joystick control, a dragged distance of the drag operation; and control, in response the dragged distance reaching a target distance, the virtual object to move in the first movement state.

In some embodiments, the display module is further configured to display the target switch control in the interface of the virtual scene; and switch the direction joystick control to the control copy of the target switch control.

the display module is further configured to display the target switch control in the interface of the virtual scene, and display the control copy of the target switch control in a suspension state; and correspondingly, the method further includes:

controlling, in response to a drag operation for the control copy, the control copy to move in the interface of the virtual scene; and controlling the control copy to be at a released position of the drag operation in response to the drag operation being released.

In some embodiments, the virtual scene includes at least two regions, and the display module is further configured to display a switch control in each of the at least two regions.

In some embodiments, the display module is further configured to control, in a process in which the virtual object is in the second movement state, the control copy and the target switch control to be in an unselectable state;

control, in response to the virtual object being switched from the second movement state to the first movement state, the control copy and the target switch control to be switched from the unselectable state to a selectable state; and trigger the state switching operation based on the control copy or the target switch control in the selectable state.

In some embodiments, the switching module is further configured to receive a press operation for the control copy, the press operation being used as the state switching operation; and correspondingly, after the controlling the virtual object to be switched from the second movement state to the first movement state, the method further includes:

controlling the virtual object to be in the second movement state before the press operation is released, and controlling, in response to the press operation being released, the virtual object to be switched from the second movement state to the first movement state.

In some embodiments, the switching module is further configured to receive a first click/tap operation for the control copy, the first click/tap operation being used as the state switching operation; and receive a second click/tap operation for the control copy; and control, in response to the second click/tap operation, the virtual object to be switched from the second movement state to the first movement state.

In some embodiments, the switching module is further configured to receive a slide operation triggered based on a direction adjustment region in the interface of the virtual scene; and adjust a movement perspective of the virtual object based on a slide direction and a slide distance that correspond to the slide operation, an adjustment direction of the movement perspective being corresponding to the slide direction, and an adjustment angle of the movement perspective being corresponding to the slide distance.

In some embodiments, the control copy is a combined control including a steering wheel and a switch button, and the switching module is further configured to receive a direction adjustment operation triggered based on the steering wheel;

correspondingly, the adjusting a movement perspective of the virtual object includes:

obtaining a trigger position of the direction adjustment operation on the steering wheel; and adjusting a movement perspective of the virtual object according to a direction indicated by the trigger position.

In some embodiments, the control copy is a combined control including a direction joystick and a switch button, and the switching module is further configured to control, in response to a drag operation for the direction joystick, the virtual object to move in the second movement state toward a direction indicated by the drag operation.

In some embodiments, the state switching operation is a press operation for the control copy, and the switching module is further configured to obtain a pressure value corresponding to the press operation; and control, based on the pressure value, the virtual object to move in the second movement state at a speed corresponding to the pressure value.

An embodiment of this application provides a computer program product or a computer program. The computer program product or the computer program includes computer instructions, and the computer instructions are stored in a computer-readable storage medium. A processor of a computer device reads the computer instructions from a computer-readable storage medium and executes the computer instructions to cause the computer device to perform the foregoing virtual object control method according to the embodiments of this application.

An embodiment of this application provides a computer-readable storage medium storing executable instructions, the executable instructions, when executed by a processor, causing the processor to perform the method provided in the embodiments of this application, for example, the method shown in FIG. 3.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic memory, a compact disc, or a CD-ROM; or may be various devices including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially configured for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A virtual object control method, performed by a computer device, the method comprising:
   displaying a direction control in a display region of an interface of a virtual scene;
   in response to a user operation on the direction control, controlling a virtual object in the virtual scene to move in a first movement state;
   only in response to the virtual object being in the first movement state, replacing the direction control with a switch control and a target switch control in the interface, wherein the replacing comprises removing the direction control from being displayed in the display region and displaying the switch control in the same display region; and
   controlling, in response to a state switching operation triggered based on the switch control, the virtual object to be switched from the first movement state to a second movement state.

2. The method according to claim 1, wherein the user operation comprises a drag operation, and wherein the virtual object is controlled to move in the first movement state in response to a dragged distance of the drag operation reaching a target distance.

3. The method according to claim 1, further comprising:
   displaying the switch control in a suspension state in the interface.

4. The method according to claim 1, further comprising:
   controlling, in response to a drag operation for the switch control, the switch control to move in the interface of the virtual scene; and
   controlling the switch control to be at a released position of the drag operation in response to the drag operation being released.

5. The method according to claim 1, further comprising:
   controlling the switch control to be in an unselectable state when the virtual object is in the second movement state.

6. The method according to claim 5, further comprising:
   controlling, in response to the virtual object being switched from the second movement state to the first movement state, the switch control to be switched from the unselectable state to a selectable state; and
   triggering the state switching operation based on the switch control being in the selectable state.

7. The method according to claim 1, further comprising:
   receiving a press operation for the switch control, the press operation being used as the state switching operation.

8. The method according to claim 1, further comprising:
receiving a click/tap operation for the switch control, the click/tap operation being used as the state switching operation.

9. The method according to claim 1, further comprising:
receiving a slide operation triggered based on a direction adjustment region in the interface of the virtual scene; and
adjusting a movement perspective of the virtual object based on a slide direction and a slide distance that correspond to the slide operation, an adjustment direction of the movement perspective corresponding to the slide direction, and an adjustment angle of the movement perspective corresponding to the slide distance.

10. The method according to claim 1, wherein the switch control comprises a combined control comprising a steering wheel and a switch button, the method further comprising:
receiving a direction adjustment operation triggered based on the steering wheel;
obtaining a trigger position of the direction adjustment operation on the steering wheel; and
adjusting a movement perspective of the virtual object according to a direction indicated by the trigger position.

11. The method according to claim 1, wherein the switch control comprises a combined control comprising the direction control and a switch button, the method further comprising:
in response to a drag operation for the direction control, controlling the virtual object to move in the second movement state toward a direction indicated by the drag operation.

12. The method according to claim 1, wherein the state switching operation comprises a press operation for the switch control, the method further comprising:
obtaining a pressure value corresponding to the press operation; and
controlling, based on the pressure value, the virtual object to move in the second movement state at a speed corresponding to the pressure value.

13. The method according to claim 1, wherein the switch control comprises a control copy of the target switch control.

14. A virtual object control apparatus, comprising:
a memory configured to store a plurality of executable instructions; and
a processor configured to execute the plurality of executable instructions to:
display a direction control in a display region of an interface of a virtual scene;
in response to a user operation on the direction control, control a virtual object in the virtual scene to move in a first movement state;
only in response to the virtual object being in the first movement state, replace the direction control with a switch control and a target switch control in the interface, wherein the replacement comprises removing the direction control from being displayed in the display region and displaying the switch control in the same display region; and
control, in response to a state switching operation triggered based on the switch control, the virtual object to be switched from the first movement state to a second movement state.

15. The virtual object control apparatus according to claim 14, wherein the user operation comprises a drag operation, and wherein the processor is further configured to execute the plurality of executable instructions to determine when a dragged distance of the drag operation reaches a target distance in order to control the virtual object to move in the first movement state.

16. The virtual object control apparatus according to claim 14, wherein the processor is further configured to execute the plurality of executable instructions to:
control, in response to a drag operation for the switch control, the switch control to move in the interface of the virtual scene; and
control the switch control to be at a released position of the drag operation in response to the drag operation being released.

17. A non-transitory computer-readable storage medium, storing a plurality of executable instructions that, when executed by a processor, cause the processor to:
display a direction control in a display region of an interface of a virtual scene;
in response to a user operation on the direction control, control a virtual object in the virtual scene to move in a first movement state;
only in response to the virtual object being in the first movement state, replace the direction control with a switch control and a target switch control in the interface, wherein the replacement comprises removing the direction control from being displayed in the display region and displaying the switch control in the same display region; and
control, in response to a state switching operation triggered based on the switch control, the virtual object to be switched from the first movement state to a second movement state.

18. The non-transitory computer-readable storage medium according to claim 17, wherein the plurality of executable instructions, when executed by the processor, further cause the processor to:
control the switch control to be in an unselectable state;
control, in response to the virtual object being switched from the second movement state to the first movement state, the switch control to be switched from the unselectable state to a selectable state; and
trigger the state switching operation based on the switch in the selectable state.

19. The non-transitory computer-readable storage medium according to claim 17, wherein the state switching operation comprises a press operation, and wherein the plurality of executable instructions, when executed by the processor, further cause the processor to:
control the virtual object to be in the second movement state before the press operation is released, and control, in response to the press operation being released, the virtual object to be switched from the second movement state to the first movement state.

20. The non-transitory computer-readable storage medium according to claim 17, wherein the plurality of executable instructions, when executed by the processor, further cause the processor to:
receive a first click/tap operation for the switch control, the first click/tap operation being used as the state switching operation;
receive a second click/tap operation for the switch control; and
control, in response to the second click/tap operation, the virtual object to be switched from the second movement state to the first movement state.

* * * * *